(12) United States Patent
Park et al.

(10) Patent No.: US 8,521,190 B2
(45) Date of Patent: Aug. 27, 2013

(54) METHODS AND APPARATUS FOR LEAVING AND/OR DISCOVERING LOCALLY RELEVANT PIECES OF INFORMATION

(75) Inventors: Vincent D. Park, Budd Lake, NJ (US); Rajiv Laroia, Far Hills, NJ (US); Edward Knapp, Basking Ridge, NJ (US); Himanshu S. Amin, Solon, OH (US); MaryBeth Selby, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 69 days.

(21) Appl. No.: 13/157,059

(22) Filed: Jun. 9, 2011

(65) Prior Publication Data
US 2012/0315924 A1 Dec. 13, 2012

(51) Int. Cl.
*H04W 24/00* (2009.01)

(52) U.S. Cl.
USPC ............ 455/456.3; 455/425; 455/456.1; 455/456.2

(58) Field of Classification Search
USPC ......... 455/41.2, 41.3, 425, 456.1–456.3, 455/456.6, 457; 709/238, 239, 242, 243
See application file for complete search history.

(56) References Cited

U.S. PATENT DOCUMENTS

| | | | |
|---|---|---|---|
| 7,080,139 B1 | 7/2006 | Briggs et al. | |
| 7,606,242 B2 | 10/2009 | Whelan et al. | |
| 7,783,777 B1 * | 8/2010 | Pabla et al. | 709/238 |
| 2007/0184845 A1 | 8/2007 | Troncoso | |
| 2008/0026742 A1 * | 1/2008 | Thomas et al. | 455/425 |
| 2008/0104026 A1 * | 5/2008 | Koran | 707/3 |
| 2008/0250035 A1 * | 10/2008 | Smith et al. | 707/100 |
| 2009/0005080 A1 | 1/2009 | Forstall et al. | |
| 2009/0061862 A1 | 3/2009 | Alberth, Jr. et al. | |
| 2009/0119013 A1 | 5/2009 | O'Malley | |
| 2009/0233622 A1 | 9/2009 | Johnson | |
| 2009/0258656 A1 * | 10/2009 | Wang et al. | 455/456.1 |
| 2010/0094532 A1 | 4/2010 | Vorona | |

OTHER PUBLICATIONS

International Search Report and Written Opinion—PCT/US2012/041429—ISA/EPO—Sep. 6, 2012.

* cited by examiner

*Primary Examiner* — Wesley Kim
*Assistant Examiner* — Dinh P Nguyen
(74) *Attorney, Agent, or Firm* — James K. O'Hare

(57) ABSTRACT

Methods and apparatus for storing user generated information, e.g., reviews, comments, suggestions relevant to a particular geographic region, using local access nodes and/or facilitating discovery of the availability of the locally stored and locally relevant content through the use of peer-to-peer signals are described. In various embodiments, the locally stored and available content can be discovered when passing within range a local access point, storing the locally relevant user provided content. User generated information, in some embodiments, can be stored subject to user specified sharing restrictions. In various embodiments, users can limit the information they are provided by controlling profile setting and/or a setting used to control what information is provided as they move through a region. In some embodiments, user provided information distribution and/or access can be, and sometimes is, restricted based on group membership, user identity and/or interests.

31 Claims, 16 Drawing Sheets

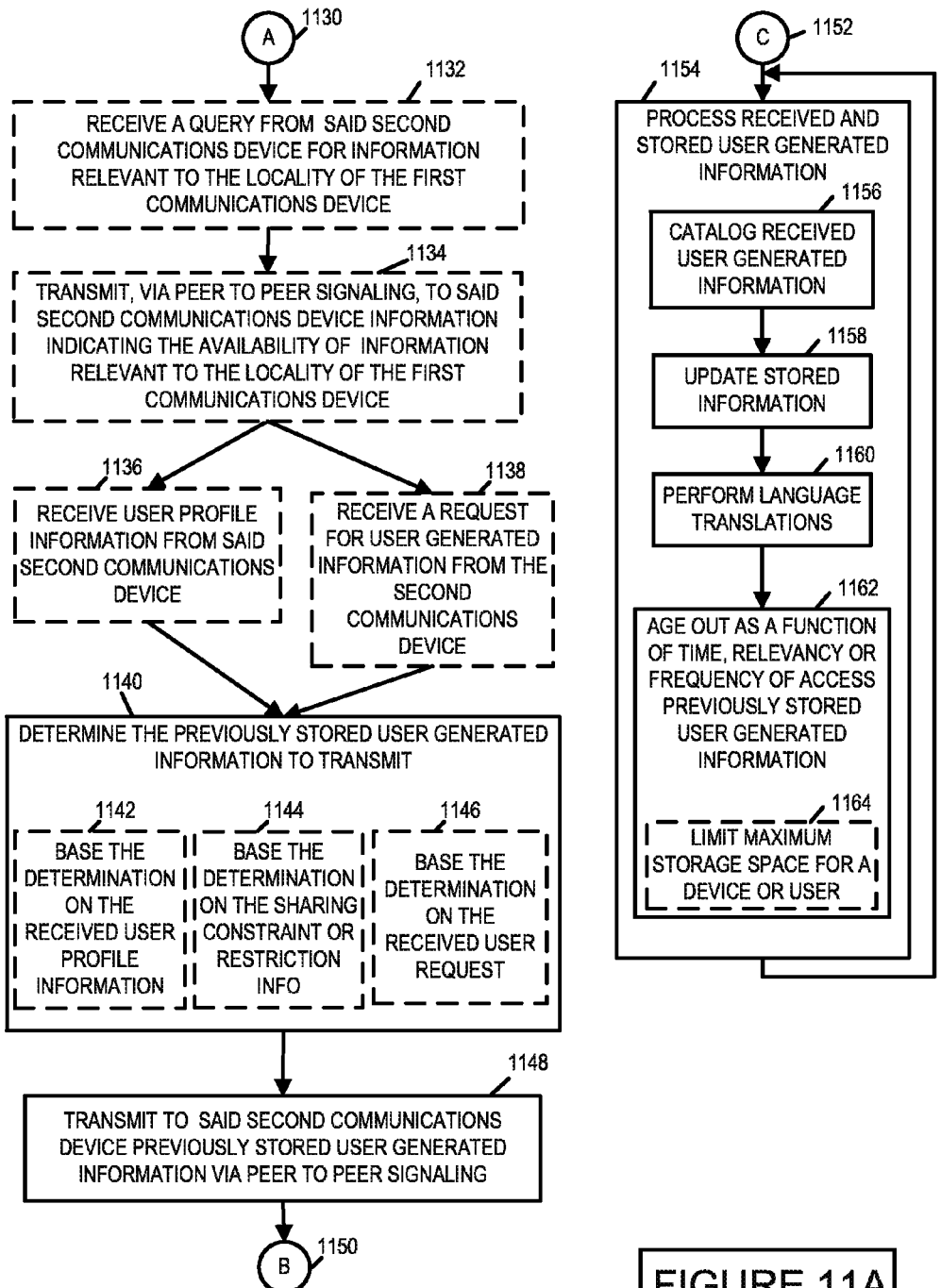

METHODS AND APPARATUS FOR LEAVING AND/OR DISCOVERING LOCALLY RELEVANT PIECES OF INFORMATION

FIELD

Various embodiments relate to wireless communications, and more particularly, to methods and apparatus related to sharing locally relevant information.

BACKGROUND

As people move throughout a geographic area they may come upon unfamiliar locations and/or settings. It would be useful if people could leave information relevant to an area for others to discover as they pass through the area, e.g., a review of a restaurant or a comment regarding a particular point of interest that other individuals, e.g., members of a particular group, might find of interest. For example, while in a national park a visitor might find it helpful if he could find a suggestion from a person with a common interest, e.g., bird watching or watching sunsets, suggesting a good vista or bird watching location. People from particular countries may find it useful or helpful to receive locally applicable suggestions and/or comments regarding a particular location, e.g., suggestions with regard to restaurants where the waiters speak a particular language or have food that the visitors are accustomed to eating.

While the Internet affords an opportunity for storing information through use of online reviews of products and services, comments on blogs, community-provided data on applications such as Google Earth and so forth, there are drawbacks with the current system. A drawback with the current system is that one must actually know what he wants to search for before accessing the information. Consider for example that you are walking down a street in an unfamiliar city and wanted to find out what other people had to say who were in similar situations. You would typically need to perform many different web searches to find a satisfactory amount of relevant information and, in many cases, might have no idea as to what to search for on the Internet or which web sites to check.

Another problem with Internet based reviews and comments are that a person may not have easy access to the Internet while at or near a site of interest, e.g., passing through a park, down a street or near a restaurant. Thus an individual seeking information may be unable to obtain access to the stored Internet based information when it is needed. In addition, an individual may not be inclined to submit an Internet based review or comment at a later time. Also, Internet based reviews or comments, which are submitted at later time and different location than the site of interest may tend to be less accurate than if the review or comment could have been stored while the individual was at the location of interest.

Peer to peer communications devices are becoming increasingly common and many devices which support telephone communications and/or Internet access are beginning to also support peer to peer communications. Peer to peer communications may occur in locations even where Internet access may not be readily available.

In view of the above discussion, it should be appreciated that there is a need for improved methods and apparatus for making locally relevant information available to people as they pass through a particular area. It should be appreciated that at least some methods and apparatus make it easy for people passing through an area to discover information that may be of interest without the need to actively search for such information, e.g., via the Internet. In addition to allowing individuals to discover locally relevant information it would be desirable if individuals could add to the local body of information thereby building up the base of locally available and discoverable reviews, comments and/or suggestions over time.

SUMMARY

Methods and apparatus for storing user generated information, e.g., reviews, comments, suggestions relevant to a particular geographic region, using local access nodes and/or facilitating discovery of the availability of the locally stored and locally relevant content through the use of peer to peer signals, e.g., peer to peer discovery signals are described. In various embodiments the peer to peer signals are direct signals which do not pass through another device. In various embodiments, the locally stored and available content can be discovered when passing within range of the node, e.g., a local access point, storing the user provided content. In some embodiments, a user need not actively look or search for such information and can discover locally relevant information they might not have even thought to search for. User generated information, in some embodiments, can be stored subject to user specified sharing restrictions. In various embodiments, users can limit the information they are provided by controlling profile settings and/or a setting used to control what information is provided as they move through a region. In some embodiments, user provided information distribution and/or access can be, and sometimes is, restricted based on group membership, user identity and/or interests.

An exemplary method of operating a first communications device to support interactive location-based information sharing, in accordance with some embodiments, comprises: detecting a signal indicating that a second communications device in wireless communications range of said first communications device supports user generated locally relevant point of interest information sharing; and transmitting to said second communications device user generated information to be stored in said second communications device and shared with a third communications device corresponding to another user within wireless communications range of said second communications device. A first communications device, in accordance with some embodiments, comprises: at least one processor configured to: detect a signal indicating that a second communications device in wireless communications range of said first communications device supports user generated locally relevant point of interest information sharing; and transmit to said second communications device user generated information to be stored in said second communications device and shared with a third communications device corresponding to another user within wireless communications range of said second communications device. The exemplary first communications device further comprises memory coupled to said at least one processor.

An exemplary method of operating a first communications device, in accordance with some embodiments, comprises: detecting a signal indicating that a second communications device in wireless communications range of said first communications device supports user generated locally relevant point of interest information sharing; and receiving from said second communications device previously stored user generated information via peer to peer signaling. An exemplary first communications device, in accordance with some embodiments, comprises: at least one processor configured to: detect a signal indicating that a second communications device in wireless communications range of said first communications device supports user generated locally relevant point of interest information sharing; and receive from said second communications device previously stored user generated information via peer to peer signaling. The exemplary first communications device further comprises memory coupled to said at least one processor.

A method of operating a first communications device to support interactive location-based information sharing, in accordance with some embodiments, comprises transmitting a signal indicating that said first communications device supports user generated locally relevant point of interest information sharing; and receiving from a second communications device user generated information to be stored in said first communications device and shared with a third communications device corresponding to another user within wireless communications range of said first communications device. An exemplary first communications device, in accordance with some embodiments, comprises: at least one processor configured to: transmit a signal indicating that said first communications device supports user generated locally relevant point of interest information sharing; and receive from a second communications device user generated information to be stored in said first communications device and shared with a third communications device corresponding to another user within wireless communications range of said first communications device. The exemplary first communications device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 11B is a second part of a flowchart of an exemplary method of operating a first communications device supporting user generated locally relevant point of interest information sharing, in accordance with an exemplary embodiment.

DETAILED DESCRIPTION

Figure 1:
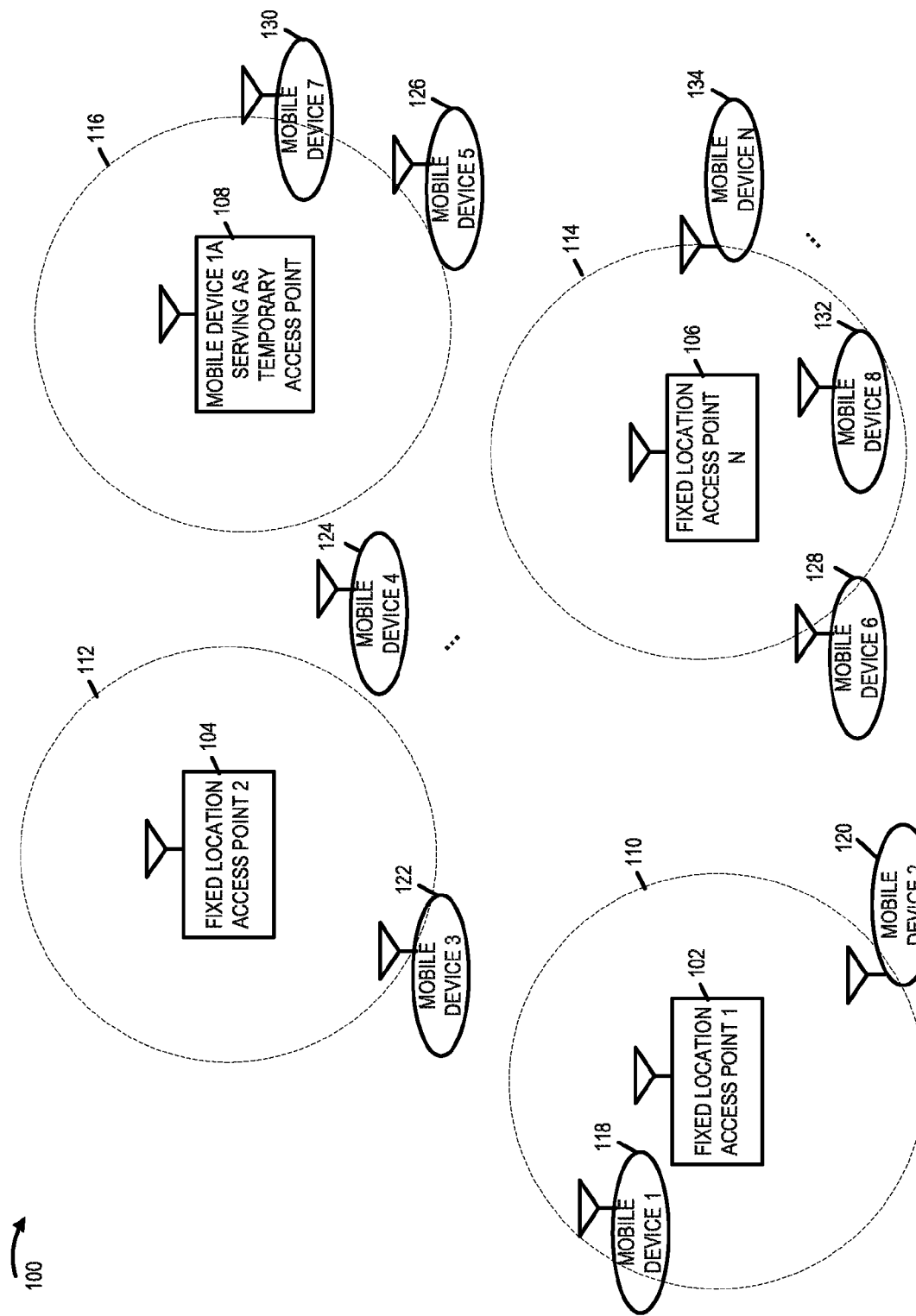
FIG. 1 is a drawing of an exemplary wireless communications system in accordance with an exemplary embodiment.

FIG. 1 is a drawing of an exemplary wireless communications system 100 in accordance with an exemplary embodiment. Exemplary wireless communications system 100 includes a plurality of fixed location access points (fixed location access point 1 102, fixed location access point 2 104, . . . , fixed location access point N 106). Each of the fixed location access points (102, 104, 106), has a corresponding wireless coverage area (110, 112, 114), respectively. Exemplary communications system 100 may, and sometimes does, include mobile devices which serve temporarily as access points. Mobile device 1A 108 is serving as a temporary access point and has a corresponding wireless coverage area 116. Exemplary system 100 also includes a plurality of mobile devices, e.g., mobile wireless terminals, (mobile device 1 118, mobile device 2 120, mobile device 3 122, mobile device 4 124, mobile device 5 126, mobile device 6 128, mobile device 7 130, mobile device 8 132, . . . , mobile device N 134. The mobile devices (118, 120, 122, 124, 126, 128, 130, 132, . . . , 134) may move throughout the system and communicate via direct peer to peer communications with an access point within wireless range.

The fixed location access points (102, 104, . . . , 106) and the mobile device serving as a temporary access point 108 support user generated locally relevant point of interest information sharing. The mobile devices (118, 120, 122, 124, 126, 128, 130, 132, . . . , 134) can, and some do, transmit and/or receive user generated information, via peer to peer direct communications with a fixed location access point or a mobile device serving as a temporary access point within communications range. For example, in FIG. 1 mobile device 1 118 is within wireless range of fixed location access point 1 102 and may transmit user generated information to node 102 to be stored by node 102 and later communicated to other mobile devices which are within range of node 102. Mobile device 1 118 may also receive user generated information, which has been previously stored at node 102 by other mobile devices which were within range of mobile node 102.

In various embodiments, peer to peer signaling is used for the communications between the access points and mobile devices. In some such embodiments, at least some of the information related to user generated information communications is carried via peer to peer discovery signals.

Figure 2:
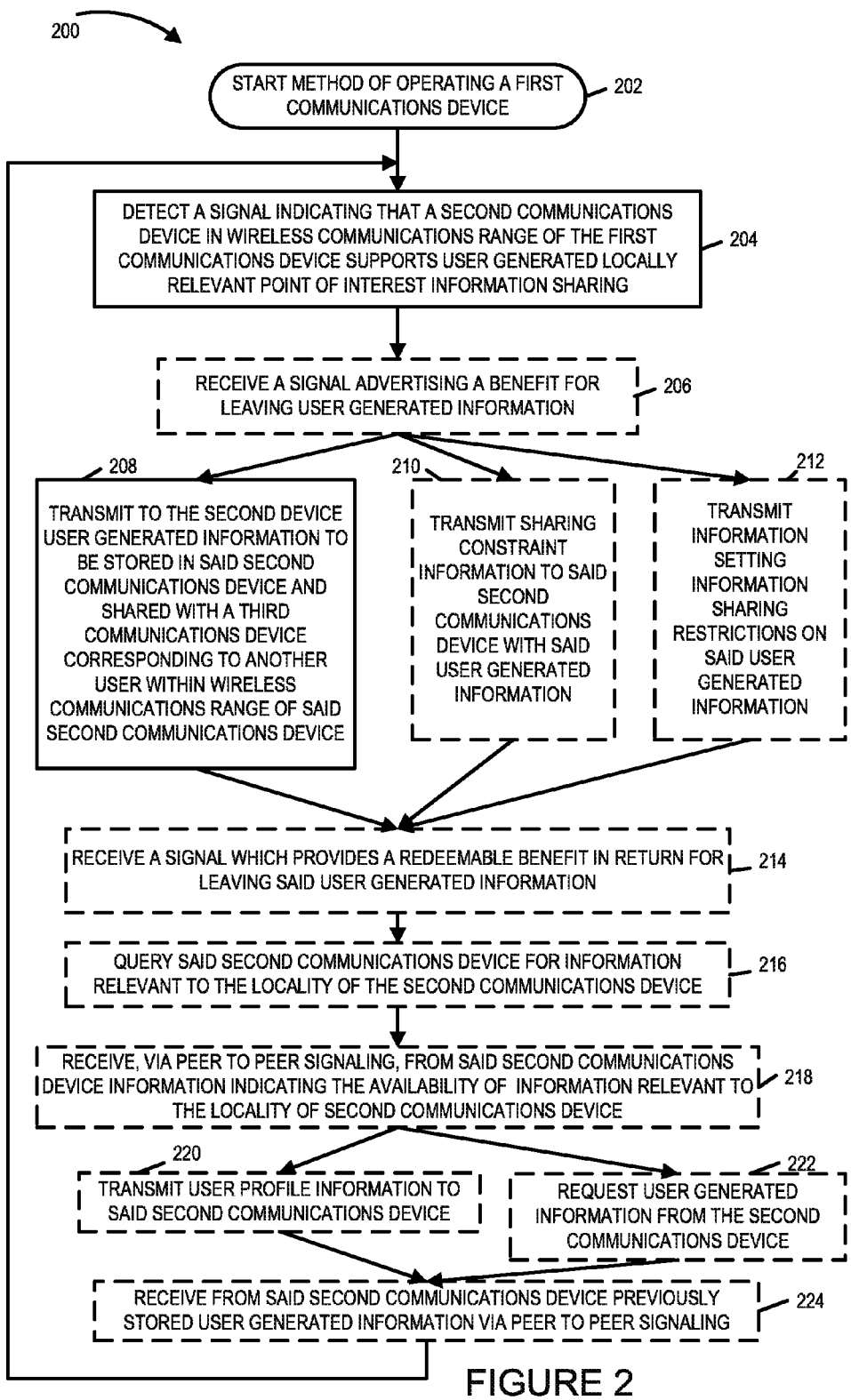
FIG. 2 is a flowchart of an exemplary method of operating a first communications device, e.g., a mobile wireless terminal, to support interactive location based information sharing, in accordance with various exemplary embodiments.

FIG. 2 is a flowchart 200 of an exemplary method of operating a first communications device, e.g., a mobile wireless terminal, to support interactive location based information sharing, in accordance with various exemplary embodiments. In various embodiments, the first communications device supports peer to peer signaling. The first communications device is, e.g., one of the mobile wireless communications devices of exemplary communications system 100 of FIG. 1.

Operation of the exemplary method starts in step 202, where the first communications device is powered on and initialized. Operation proceeds from start step 202 to step 204. In step 204, the first communications device detects a signal indicating that a second communications device in wireless communications range of the first communications device supports user generated locally relevant point of interest information sharing. In some embodiments, the second communications device is a standalone system that is not connected to the Internet. In various embodiments, the second communications device is a standalone system capable of independently processing, cataloging and responding to queries. In some embodiments, the second communications device stores locally relevant user generated information from multiple user devices. In some embodiments, the second communications device is an access point. In some embodiments, the access point is a fixed location access point. In some embodiments, the second communications device supports a peer to peer wireless communications signaling protocol. In some embodiments, the second communications device is a mobile peer to peer wireless terminal, e.g., a mobile peer to peer wireless terminal serving as a temporary access point at a particular location. In various embodiments, the detected signal indicating that the second communications device supports user generated locally relevant information sharing is a peer to peer discovery signal broadcast by said second communications device. Operation proceeds from step 204 to step 206.

In step 206 the first communications device receives a signal advertising a benefit for leaving user generated information. Operation proceeds from step 206 to step 208. In some embodiments, operation also proceeds from step 206 to one or more of steps 210 and 212.

In step 208 the first communications device transmits to the second communications device user generated information to be stored in said second communications device and shared with a third communications device corresponding to another user within wireless communications range of said second communications device. In some embodiments, the user generated information is one of a review, a sightseeing suggestion, or a user comment relevant to something in the vicinity of the second communications device. In some embodiments, the user generated information may, and sometimes does, include information indicting one of a predetermined plurality of feedback options, e.g., one of a predetermined plurality of possible rating levels. In step 210 the first communications device transmits sharing constraint information to said second communications device with said user generated information. In some embodiments, the user generated information and sharing constraint information are communicated in the same signal. In some embodiments, the user generated information and sharing constraint information are communicated in the same message. In some embodiments, the user generated information and sharing constraint information are communicated as jointly coded information, e.g., as a jointly coded information block. In some embodiments, said sharing constraint information limits sharing of said transmitted user generated information to members of a group to which a user who generated said information belongs. In various embodiments, the sharing constraint information includes information specifying a subset of other users who are able to access the user generated information stored on the second communications device by the user of the first communications device which provided the user generated information to be stored. In some embodiments, said sharing constraint information precludes said user generated information from being transmitted from said second communications device to a server or core network node. In various embodiments, said sharing constraint information limits communications of said user generated information to wireless transmission of said user generated information to devices in the proximity of said second communications device. In step 212 the first communications device transmits information setting information sharing restrictions on said user generated information. In some embodiments, said information sharing restrictions restrict providing of said user generated information to at least one of: i) members of a group specified by said user leaving the information; ii) users who have an interest in common with the user leaving the information, e.g., bird watching, Italian food, etc; and iii) users who have expressed an interest in comments by the user leaving the information, e.g., individuals to whom the user leaving the comments is known such as friends of the user leaving the comments. In some embodiments, said information sharing restrictions restrict providing of said user generated information to users which know a password specified by said user leaving the information. Operation proceeds from step 208, 210 and/or 212 to step 214.

In step 214 the first communications device receives a signal which provides a redeemable benefit in return for leaving said user generated information. The benefit is, e.g., additional air link resources, an increase in a QoS level, an increase in a priority level, a monetary benefit and/or a number of redeemable bonus points. Operation proceeds from step 214 to step 216. In step 216 the first communications device queries said second communications device for information relevant to the locality of the second communications device. Operation proceeds from step 216 to step 218. In step 218 the first communications device receives, via peer to peer signaling, from the second communications device information indicating the availability of information relevant to the locality of the second communications device.

Operation proceeds from step 218 to steps 220 and 222. In step 220 the first communications device transmits user profile information to said second communications device. In some embodiments, transmitting user profile information to the second communications device includes transmitting information on the identity of the user of the first communications device and/or information on groups to which the user of the first communications device belongs. In step 222 the first communications device requests user generated information from the second communications device. In some embodiments, requesting user generated information includes requesting information for a set of information previously indicated to be available at the second communications device.

Operation proceeds from steps 220 and 222 to step 224. In step 224 the first communications device receives, from said second communications device, previously stored user generated information via peer to peer signaling. In some embodiments, the stored user generated information is one of a review, a sightseeing suggestion, or a user comment relevant to something in the vicinity of the second communications device.

In various embodiments, said received previously stored user generated information is information that was requested by said first communications device after being notified of the information's availability via peer to peer discovery signaling. In some embodiments, the received previously restored user generated information, may be, and sometimes is, in response to the request of step 222. In some embodiments, the received previously stored user generated information may be, and sometimes does, corresponds to the user profile information of step 220, e.g., the information was selected to be sent by the second communications device to the first communications device based on the received user profile information from the first communications device. In some embodiments, the received previously stored user generated information of step 224 may be, and sometimes is, determined, by the second communications device, to be communicated to the first communications device based on the user profile information of step 220. Operation proceeds from step 218 to step 204.

In various embodiments, user generated information stored in the second communications device is respectively aged out as a function or time, relevancy and/or frequency of access. In various embodiments, the second communications device may, and generally does, include stored user generated information originating from a plurality of different mobile wireless devices which were at one time in the vicinity of the second communications device. In some embodiments, the second communications device stores user generated information from users or devices authorized to leave said information. In some embodiments a user or device must be a member of an approved group or on a list of approved users or devices to be allowed to leave information at the second communications device for its information to be stored at the second communications device. In various embodiments, the list of who can leave information is dependent of the second communication device location, e.g., different locations are associated with different lists of who can leave user generated information, e.g. feedback. In some embodiments, the second communications device can, and sometimes does limit the number of information storage transactions for a device as a function of time, e.g., a limited number of reviews can be posted from the first communications device in a time period. In various embodiments, the second communications device can, and sometime does, subject individual users to a predetermined amount of storage space.

In some embodiments, user generated information may, and sometimes does, include information indicting one of a predetermined plurality of feedback options, e.g., one of a predetermined plurality of possible rating levels. In various embodiments, voting is limited to one vote per device per item or issue. In various embodiments, voting is limited to one vote per user per item or issue. In some such embodiments, a device or user can update its vote but may not have multiple votes corresponding to the same item or issue. For example, the first communications device may have one review rating level stored at the second communications device corresponding to a particular restaurant.

Steps in FIG. 2 which are indicated by dotted line boxes are optional steps. The flowchart of FIG. 2 has been described for an embodiment in which each of the optional steps are performed. If an optional step is omitted, the omitted step is bypassed in the operational flow.

Figure 3:
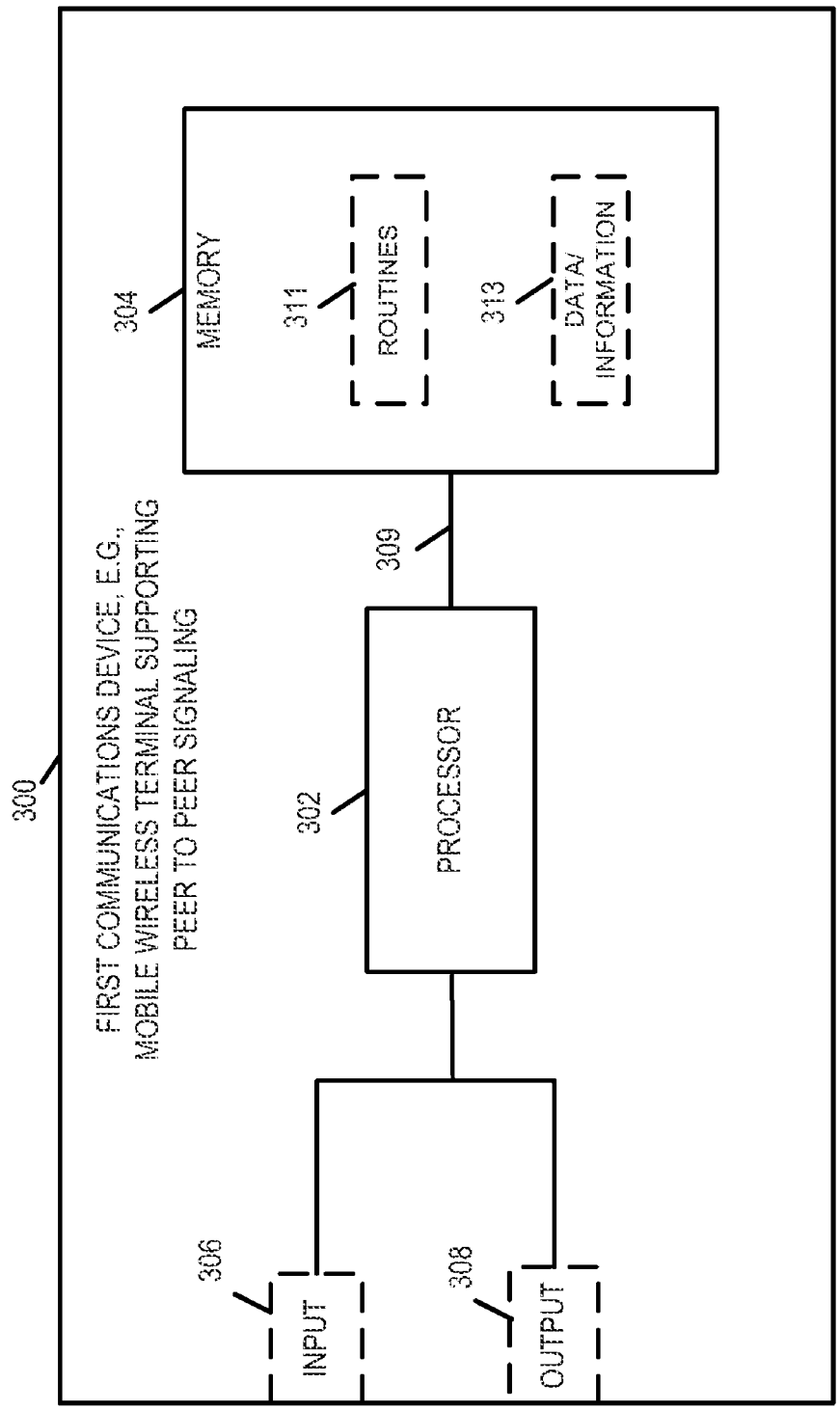
FIG. 3 is a drawing of an exemplary mobile wireless device in accordance with an exemplary embodiment.

FIG. 3 is a drawing of an exemplary first communications device which is an exemplary mobile wireless device 300, e.g., a mobile wireless terminal, in accordance with an exemplary embodiment. Exemplary mobile wireless device 300 is, e.g., one of the mobile devices of system 100 of FIG. 1. Exemplary mobile wireless device 300 may, and sometimes does, implement a method in accordance with flowchart 200 of FIG. 2.

Mobile wireless device 300 includes a processor 302 and memory 304 coupled together via a bus 309 over which the various elements (302, 304) may interchange data and information. Mobile wireless device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output. In some embodiments, memory 304 includes routines 311 and data/information 313.

Processor 302 is configured to: detect a signal indicating that a second communications device in wireless communications range of said first communications device supports user generated locally relevant point of interest information sharing; and transmit to said second communications device user generated information to be stored in said second communications device and shared with a third communications device corresponding to another user within wireless communications range of said second communications device.

In some embodiments, second communications device is a standalone system which is not connected to the Internet. In various embodiments, said second communications device is a standalone system capable of independently processing, cataloging and responding to queries. In some embodiments, said second communications device stores locally relevant user generated information from multiple user devices. In various embodiments, the second communications device is an access point. In some embodiments, the second communications device supports a peer to peer signaling protocol or protocols. In some embodiments, the second communications device is a fixed location access point, e.g., a fixed location access point supporting peer to peer signaling. In some embodiments the second communications device is a mobile peer to peer wireless terminal, e.g., a mobile peer to peer wireless terminal serving as a temporary access point at a particular location, In various embodiments, said signal indicating that said second communications device supports user generated locally relevant point of interest information sharing is a peer to peer discovery signal broadcast by said second communications device. In some embodiments, said user generated information is one of a review, sightseeing suggestion, or a user comment relevant to something in the vicinity of said second communications device.

In various embodiments, processor 302 is further configured to: query said second communications device for information relevant to the locality of the second communications device. In some embodiments, processor 302 is further configured to: transmit sharing constraint information to said second communications device with said user generated information. In some embodiments, said sharing constraint information limits sharing of said transmitted user generated information to members of a group to which a user who generated said information belongs. In some embodiments, said sharing constraint information precludes said user generated information from being transmitted from said second communications device to a server or core network node. In some embodiments, said sharing constraint information limits communication of said user generated information to wireless transmission of said user generated information to devices in the proximity of said second communications device.

In some embodiments, the sharing constraint information includes information specifying a subset of other users who are able to access the data stored on the second communications device by the user of the first communications device providing the user generated information to be stored.

In some embodiments, processor 302 is further configured to: receive a signal advertising a benefit for leaving user generated information. In some embodiments, processor 302 is further configured to: receive a signal which provides a redeemable benefit in return for leaving said user generated information.

In various embodiments, processor 302 is further configured to: transmit information setting information sharing restrictions on said user generated information. In some such embodiments, said information sharing restrictions restrict providing of said user generated information to at least one of: i) members of a group specified by said user leaving the information; ii) users who have interests in common with said user leaving the information, e.g., bird watching, Italian food, etc.; and iii) users who have expressed an interest in comments by the user leaving the information, e.g., individuals to whom the user leaving the comments is known such as friends of the user leaving the comment.

In some embodiments, processor 302 is further configured to: receive from said second communications device previously stored user generated information via peer to peer signaling. In some embodiments, said stored user generated information is one of a review, sightseeing suggestion, or a user comment relevant to something in the vicinity of said second communications device.

In various embodiments, processor 302 is further configured to: receive, via peer to peer signaling, from the second communications device, information indicating the availability of information relevant to the locality of the second communications device.

In various embodiments, processor 302 is further configured to: request user generated information from the second communications device; and the received previously stored user generated information is in response to said request. In some such embodiments, processor 302 is configured to request information from a set of information previously indicated to be available at said second communications device, as part of being configured to request user generated information.

In some embodiments, processor 302 is further configured to: transmit user profile information to said second communications device; and being configured to receive from said second communications device previously stored user generated information includes being configured to receive from said second communications device previously stored user generated information corresponding to the supplied user profile information. Processor 302, in some embodiments, is configured to transmit information on the identity of the user using the first communications device and/or information on groups to which the user of the first communications device belongs, as part of being configured to transmit user profile information to said second communications device; and said received previously stored user generated information was determined to be communicated to the first communications device by said second communications device based on the user profile information.

In various embodiments, the user generated information stored in the second communications device is respectively aged out as a function of time, relevancy, or frequency of access. In some embodiments, said second communications device stores user generated information from users or devices authorized to leave said information. For example, in some embodiments, the first communications device or user of the first communications device, must be a member of an approved group, or on a list of approved users or approved devices, etc., in order to be authorized to leave information at the second communications device. In various embodiments, processor 302 is configured to communicate information to identify that the first communications device is authorized to store user generated information at the second communications device, e.g., as part of user profile information. In some embodiments, lists of who can leave information are dependent on the second device location. For example, different locations can be and sometimes are associated with different lists of who can leave feedback. In some embodiments, processor 302 is configured to identify whether or not it is authorized to transmit user generated information based on its location. In some embodiments, the number of information storage transactions are limited for a device as a function of time, e.g., a limited number of reviews can be posted from a device in a time period. In some embodiments, processor 302 is configured to track the number of user generated information transmissions to the second communications device. In some embodiments, processor 302 is configured to control transmission of user generated information to the second communications device as a function of the number of user generated information storage transactions in a given period of time at the second communications device.

In some embodiments, said user generated information includes information indicating one of predetermined plurality of feedback options corresponding, e.g., one of a plurality of possible rating levels. In some embodiments voting may be limited to one per device or user per item. For example, the first communications device can update its vote but not have multiple votes count, e.g., one review per device or user per corresponding to the same restaurant.

In some embodiments, the second communications device can subject individual users to a predetermined amount of storage space. In some such embodiments, processor 302 is configured to track the amount of user generated information sent to the second communications device and to base decisions whether or not to transmit additional user generated information to the second communications device based on the tracked amount of stored information. In various embodiments, processor 302 is configured to limit voting in accordance with the voting implemented rules, e.g., number of votes allowed.

Figure 4:
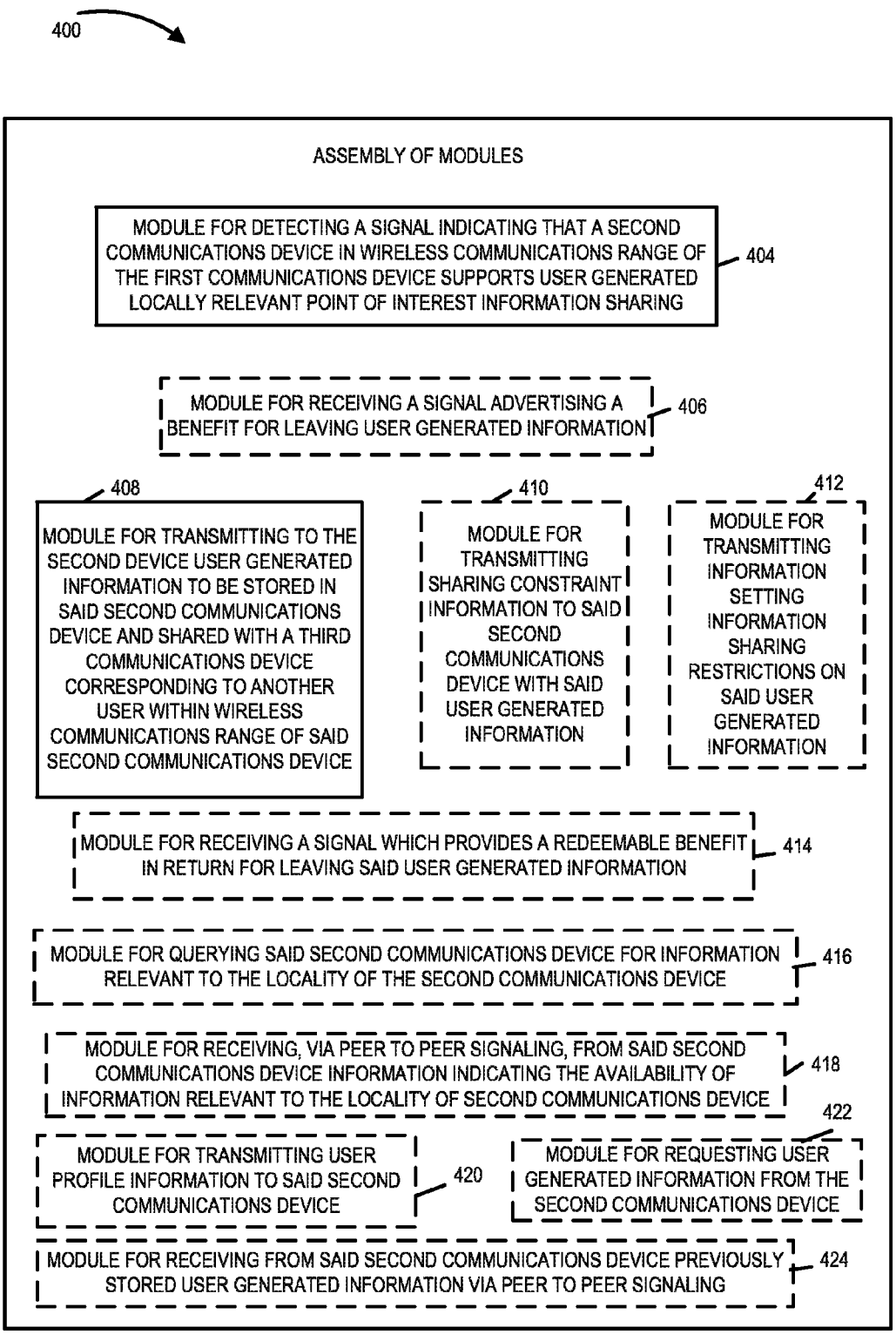
FIG. 4 is an assembly of modules which can, and in some embodiments is, used in the mobile wireless device illustrated in FIG. 3.

FIG. 4 is an assembly of modules 400 which can, and in some embodiments is, used in the exemplary first communications device which is exemplary mobile wireless device 300 illustrated in FIG. 3. The modules in the assembly 400 can be implemented in hardware within the processor 302 of FIG. 3, e.g., as individual circuits. Alternatively, the modules may be implemented in software and stored in the memory 304 of the mobile wireless device 300 shown in FIG. 3. In some such embodiments, the assembly of modules 400 is included in routines 311 of memory 304 of device 300 of FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the mobile wireless device 300 or elements therein such as the processor 302, to perform the functions of the corresponding steps illustrated and/or described in the method of flowchart 200 of FIG. 2.

Assembly of modules 400 includes a module 404 for detecting a signal indicating that a second communications device in wireless communications range of the first communications device supports user generated locally relevant point of interest information sharing, a module 408 for transmitting to the second device user generated information to be stored in said second communications device and shared with a third communications device corresponding to another user within wireless communications range of said second communications device. In some embodiments, assembly of modules 400 further includes one or more or all of: a module 406 for receiving a signal advertising a benefit for leaving user generated information, a module 410 for transmitting sharing constraint information to second communications device with said user generated information, a module 412 for transmitting information setting information sharing restriction on said user generated information, a module 414 for receiving a signal which provides a redeemable benefit in return for leaving said user generated information, a module 416 for querying said second communications device for information relevant to the locality of the second communications device, a module 418 for receiving, via peer to peer signaling, from said second communications device information indicating the availability of information relevant to the locality of the second communications device, a module 420 for transmitting user profile information to the second communications device, a module 422 for requesting user generated information from the second communications device and a module 424 for receiving from the second communications device previously stored information via peer to peer signaling.

Figure 5:
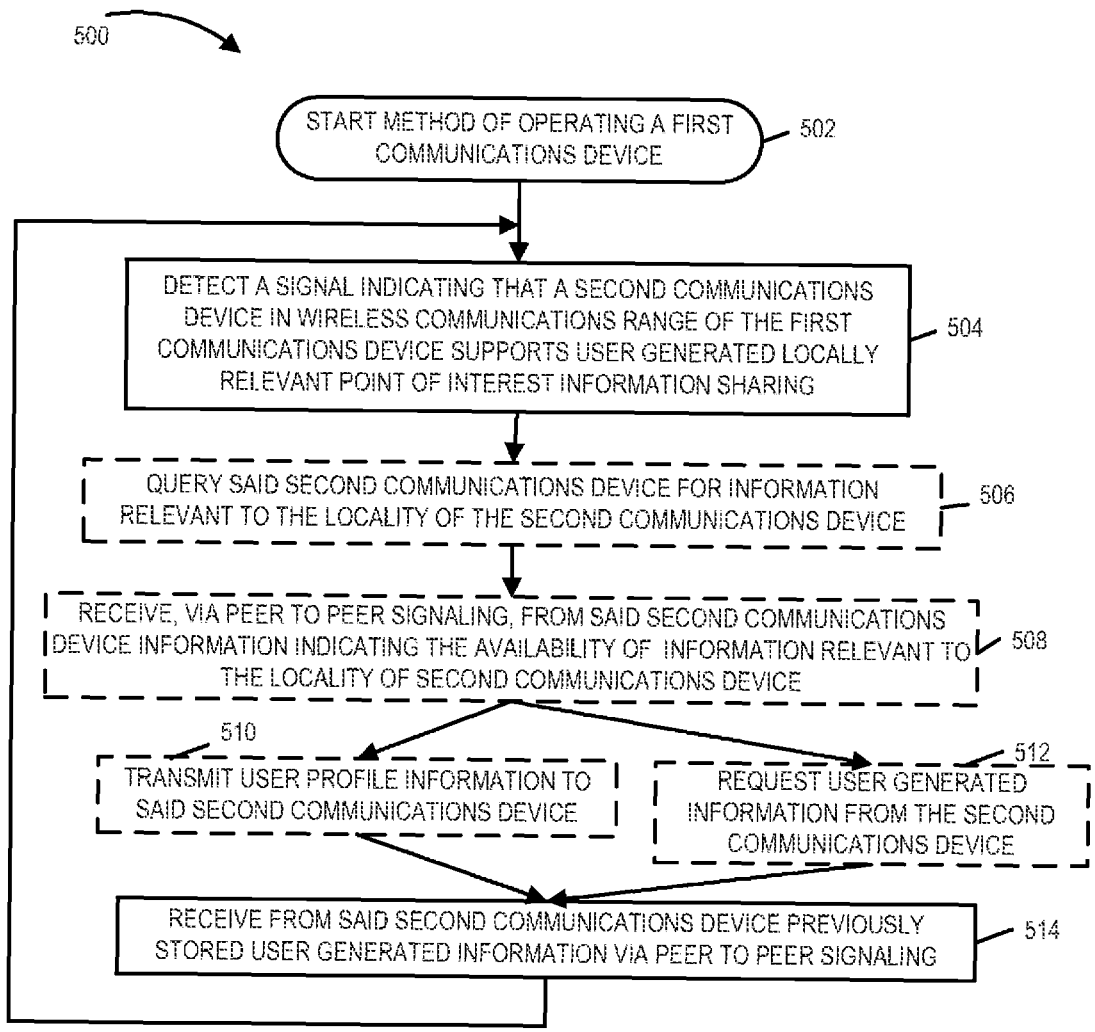
FIG. 5 is a flowchart of an exemplary method of operating a first communications device in accordance with an exemplary embodiment.

FIG. 5 is a flowchart 500 of an exemplary method of operating a first communications device in accordance with an exemplary embodiment. Operation of the exemplary method starts in step 502 where the first communications device is powered on and initialized. Operation proceeds from start step 502 to step 504, in which the first communications device detects a signal indicating that a second communications device in wireless range of the first communications device supports user generated locally relevant point of interest information sharing.

In some embodiments, the second communications device is a standalone system which is not connected to the Internet. In various embodiments, the second communications device is a standalone system capable of independently processing, cataloging and responding to queries. In some embodiments, the second communications device stores locally relevant user generated information from multiple user devices. In some embodiments, the second communications device is an access point. In some embodiments, the second communications device supports peer to peer signaling. In various embodiments, the second communications device is a fixed location access point supporting peer to peer signaling. In some embodiments, the second communications device is a mobile peer to peer wireless terminal, e.g., a mobile peer to peer wireless terminal serving as a temporary access point at a particular location.

In some embodiments, the signal indicating that the second communications device supports user generated locally relevant point of interest information sharing is a peer to peer discovery signal broadcast by the second communications device. Operation proceeds from step 504 to step 506.

In step 506 the first communications device queries said second communications device for information relevant to the locality of the second communications device. Then in step 508 the first communications device receives, via peer to peer signaling from the second communications device information indicating the availability of information relevant to the locality of the second communications device. Operation proceeds from step 508 to steps 510 and 512.

In step 510 the first communications device transmits user profile information to the second communications device. In various embodiments, transmitting user profile information to said second communications device includes transmitting information on the identity of the user using the first communications device and/or information on groups to which the user of the first communications device belongs. In step 512 the first communications device requests user generated information from the second communications device. In some embodiments, requesting user generated information includes requesting information from a set of information previously indicated to be available at the second communications device. Operation proceeds from step 510 and step 512 to step 514.

In step 514 the first communications device receives from the second communications device previously stored user generated information via peer to peer signaling. In various embodiments, the stored user generated information is one of a review, a sightseeing suggestion, or a user comment relevant to something in the vicinity of the second communications device. In some embodiments, the received previously stored user generated information may be, and sometimes is, in response to said request of step 512. In some embodiments, receiving from the second communications device previously stored user generated information may, and sometimes does, include receiving from the second communications device previously stored user generated information corresponding the supplied user profile information of step 510. In some such embodiments, the received previously stored user generated information was determined to be communicated to the first communications device by the second communications device based on the user profile information, e.g., based on a user identity information or group membership information. Operation proceeds from step 514 to step 504.

Steps in FIG. 5 which are indicated by dotted line boxes are optional steps. The flowchart of FIG. 5 has been described for an embodiment in which each of the optional steps are performed. If an optional step is omitted, the omitted step is bypassed in the operational flow.

Figure 6:
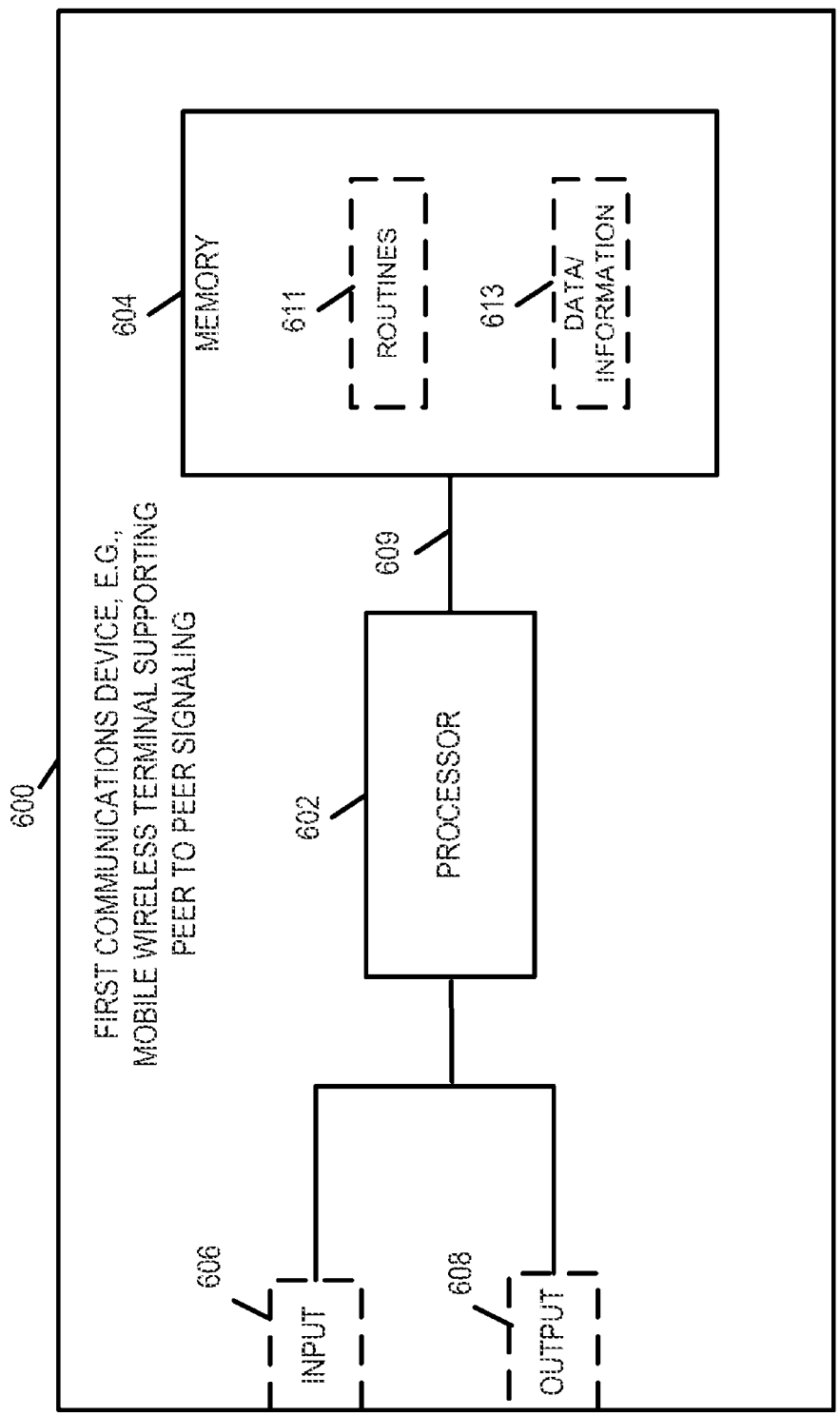
FIG. 6 is a drawing of an exemplary mobile wireless device in accordance with an exemplary embodiment.

FIG. 6 is a drawing of an exemplary first communications device which is an exemplary mobile wireless device 600, e.g., a mobile wireless terminal, in accordance with an exemplary embodiment. Exemplary mobile wireless device 600 is, e.g., one of the mobile devices of system 100 of FIG. 1.

Exemplary mobile wireless device 600 may, and sometimes does, implement a method in accordance with flowchart 500 of FIG. 5.

Mobile wireless device 600 includes a processor 602 and memory 604 coupled together via a bus 609 over which the various elements (602, 604) may interchange data and information. Mobile wireless device 600 further includes an input module 606 and an output module 608 which may be coupled to processor 602 as shown. However, in some embodiments, the input module 606 and output module 608 are located internal to the processor 602. Input module 606 can receive input signals. Input module 606 can, and in some embodiments does, include a wireless receiver and/or a wired or optical input interface for receiving input. Output module 608 may include, and in some embodiments does include, a wireless transmitter and/or a wired or optical output interface for transmitting output. In some embodiments, memory 604 includes routines 611 and data/information 613.

Processor 602 is configured to detect a signal indicating that a second communications device in wireless communications range of said first communications device supports user generated locally relevant point of interest information sharing; and receive from said second communications device previously stored user generated information via peer to peer signaling. In some embodiments, the second communications device is a standalone system which is not connected to the Internet. In some embodiments, said second communications device is a stand along system capable of independently processing, cataloging and responding to queries. In various embodiments, said second communications device stores locally relevant user generated information from multiple user devices. In some embodiments, the second communications device supports peer to peer signaling. In some embodiments, the second communications device is a fixed location access point supporting peer to peer signaling. In some embodiments, the second communications device is a mobile peer to peer wireless terminal, e.g., a mobile peer to peer wireless terminal serving as a temporary access point at a particular location.

In various embodiments, said signal indicating that said second communications device supports user generated locally relevant point of interest information sharing is a peer to peer discovery signal broadcast by said second communications device. In some embodiments, said stored user generated information is one of a review, sightseeing suggestion, or a user comment relevant to something in the vicinity of said second communications device.

Processor 602, in some embodiments, is further configured to query said second communications device for information relevant to the locality of the second communications device. Processor 602, in various embodiments, is further configured to: receive, via peer to peer signaling, from the second communications device, information indicating the availability of information relevant to the locality of the second communications device.

Processor 602, in some embodiments, is further configured to: request user generated information from the second communications device; and the received previously stored user generated information is in response to said request. In some such embodiments, processor 602 is configured to request information from a set of information previously indicated to be available at said second communications device, as part of being configured to request user generated information.

In some embodiments, processor 602 is further configured to transmit user profile information to said second communications device; and processor 602 is configured to receive from said second communications device previously stored user generated information corresponding to the supplied user profile information, as part of being configured to receive from said second communications device previously stored user generated information.

Processor 602, in various embodiments, is configured to transmit information on the identity of the user using the first communications device and/or information on groups to which the user of the first communications device belongs, as part of being configured to transmit user profile information to said second communications device; and said received previously stored user generated information was determined to be communicated to the first communications device by said second communications device based on the user profile information.

Figure 7:
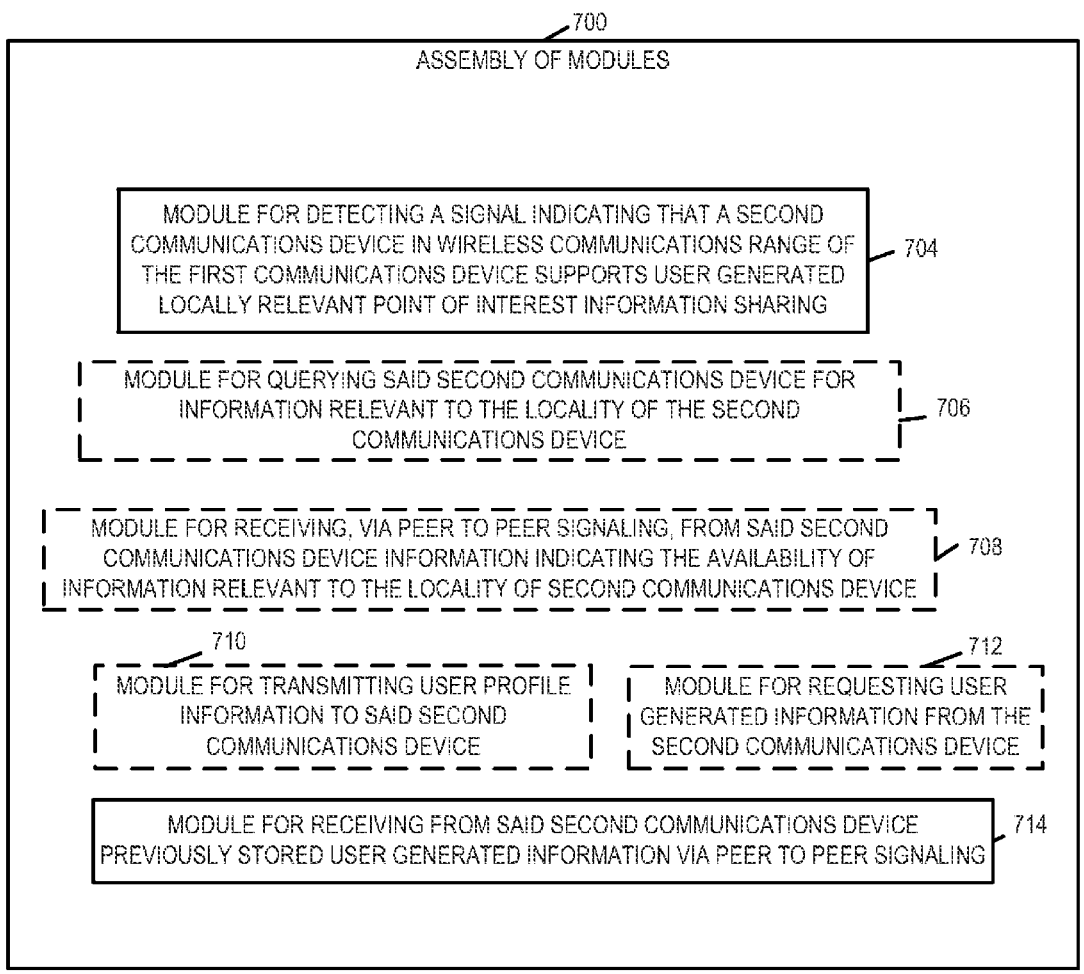
FIG. 7 is an assembly of modules which can, and in some embodiments is, used in the mobile wireless device illustrated in FIG. 6.

FIG. 7 is an assembly of modules 700 which can, and in some embodiments is, used in the mobile wireless device 600 illustrated in FIG. 6. The modules in the assembly 700 can be implemented in hardware within the processor 602 of FIG. 6, e.g., as individual circuits. Alternatively, the modules may be implemented in software and stored in the memory 604 of the mobile wireless device 600 shown in FIG. 6. In some such embodiments, the assembly of modules 700 is included in routines 611 of memory 604 of device 600 of FIG. 6. While shown in the FIG. 6 embodiment as a single processor, e.g., computer, it should be appreciated that the processor 602 may be implemented as one or more processors, e.g., computers. When implemented in software the modules include code, which when executed by the processor, configure the processor, e.g., computer, 602 to implement the function corresponding to the module. In some embodiments, processor 602 is configured to implement each of the modules of the assembly of modules 700. In embodiments where the assembly of modules 700 is stored in the memory 604, the memory 604 is a computer program product comprising a computer readable medium, e.g., a non-transitory computer readable medium, comprising code, e.g., individual code for each module, for causing at least one computer, e.g., processor 602, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the mobile wireless device 600 or elements therein such as the processor 602, to perform the functions of the corresponding steps illustrated and/or described in the method of flowchart 500 of FIG. 5.

Assembly of modules 700 includes a module 704 for detecting a signal indicating that a second communications device in wireless range of the first communications device supports users generated locally relevant point of information sharing and module 714 for receiving from a second communications device previously stored user generated information via peer to peer signaling. In various embodiments, assembly of modules 700 includes one or more of a module 706 for querying said second communications device for information relevant to the locality of the second communications device, a module 708 for receiving, via peer to peer signaling from said second communications device information indicating the availability of information relevant to the locality of the second communications device, a module 710 for transmitting user profile information to said second communications device, and a module 712 for request user generated information from the second communications device.

In some embodiments, the module 712 for requesting user generated information includes a module for requesting information from a set of information previously indicated to be available at said second communications device. In various embodiments the module 714 for receiving from said second communications device previously stored user generated information includes a module for receiving from said second communications device previously stored user generated information corresponding to the supplied user profile information. In some embodiments, the module 710 for transmitting user profile information to said second communications device includes a module for transmitting information on the identity of the user using the first communications device and/or information on groups to which the user of the first communications device belongs.

Figure 8:
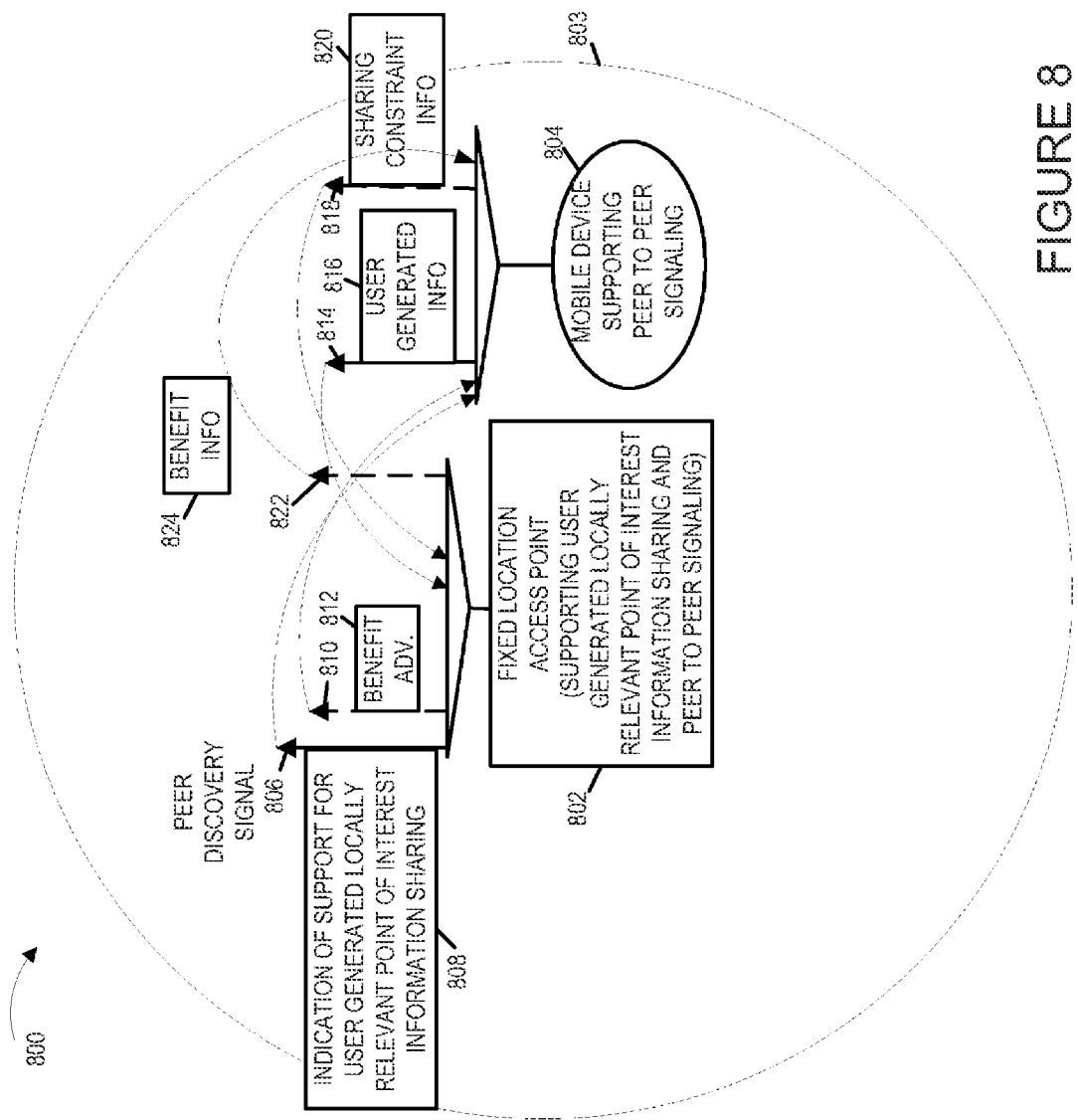
FIG. 8 is a drawing illustrating an example in which an exemplary mobile device leaves user generated locally relevant information at an access point to be shared with other mobile devices which come within communications range of the access point.

FIG. 8 is a drawing 800 illustrating an example in which an exemplary mobile device leaves user generated locally relevant information at an access point to be shared with other mobile devices which come within communications range of the access point. In the example of FIG. 8, fixed location access point 802, which supports user generated locally relevant point of interest information sharing and peer to peer signaling, has a peer to peer communications range represented by dotted circle 803. Exemplary mobile device 804, which supports peer to peer communications, is within wireless communications range of fixed location access point 802.

Fixed location access point 802 transmits peer discovery signal 806 communicating information 808 including an indication that access point 802 supports user generated locally relevant point of interest sharing. Signal 806 is received by mobile device 804 and information 808 is recovered. In some embodiments, access point 802 also transmits signal 810 communicating an advertisement that there is a benefit for leaving user generated information 812. Assume that signal 810 is also received by mobile device 804 and information 812 is recovered. Further consider that mobile device 804 decides to generate user generated information 816.

Mobile device 804 generates and transmits signal 814 including user generated information 816. In some embodiments, the mobile device 804 also transmits signal 818 including sharing constraint information 820. In some embodiments user generated information 816 and sharing constraint information 820 are communicated in the same signal.

Further consider that access point 802 receives signals 814 and 818 and recovers the user generated information 816 and sharing constraint information 820. Access point 802 stores the information 816 and 820 locally, e.g., either internally within access point 802 or locally at a storage device in the vicinity of access point 802. Access point 802 transmits signal 822 including benefit information 824 to mobile device 804, which receives signal 822 and recovers the benefit information 824.

One specific example will now be described with respect to FIG. 8. Benefit advertisement 812 indicates that a predetermined amount of additional wireless air time will be allocated to the user's account for each set of user generated information that is submitted and accepted. User generated information 816 includes a review of a restaurant that the user dined at and a review of a play that the user attended. Sharing constraint information 820 includes information identifying that the information should be shared with members of a group to which the user of mobile device belongs, e.g., a travel club from his/her own country.

Figure 9:
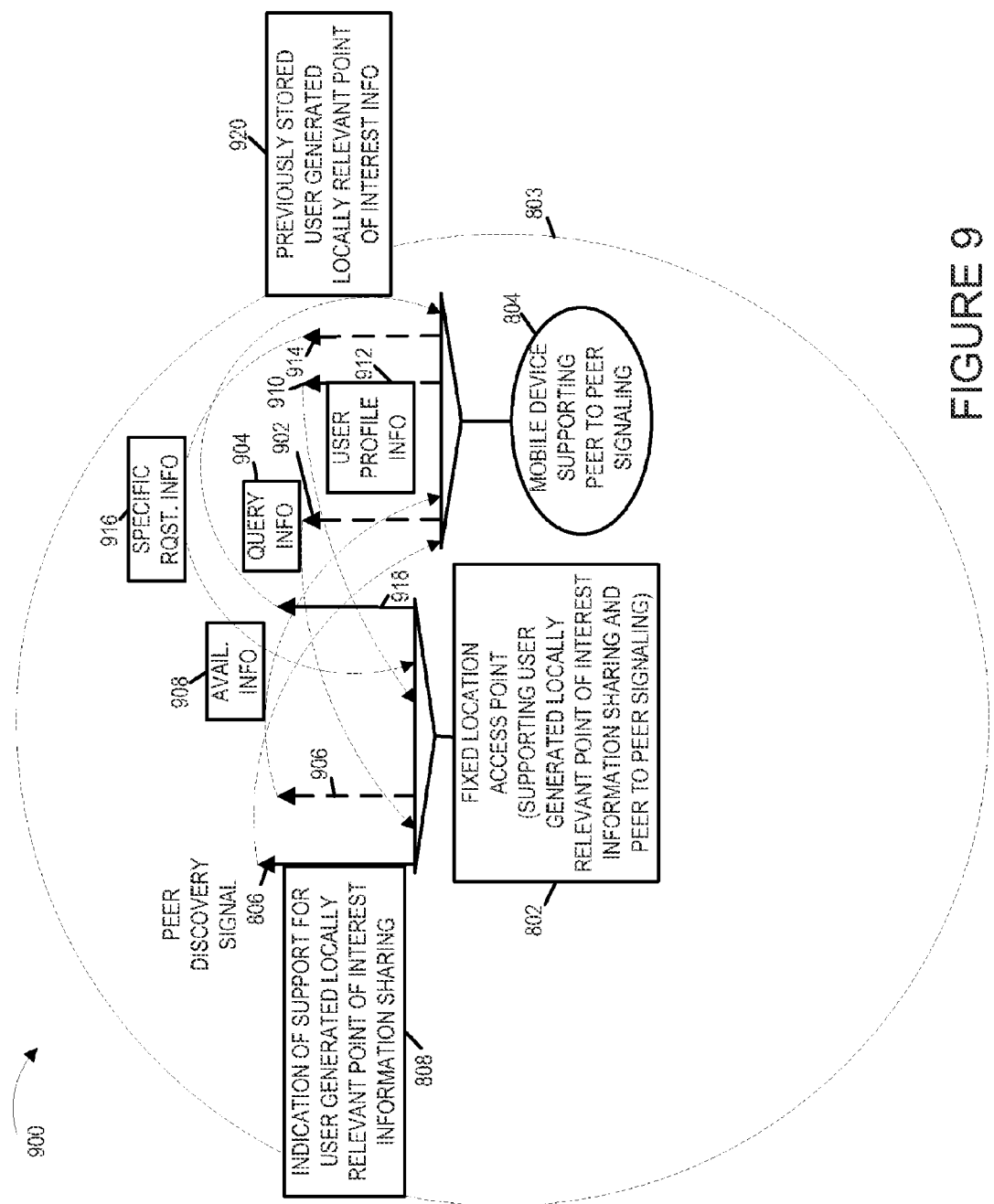
FIG. 9 is a drawing illustrating an example in which an exemplary mobile device receives previously stored user generated locally relevant information from an access point.

FIG. 9 is a drawing 900 illustrating an example in which an exemplary mobile device receives previously stored user generated locally relevant information from an access point. In the example of FIG. 9, fixed location access point 802, which supports user generated locally relevant point of interest information sharing and peer to peer signaling, has a peer to peer communications range represented by dotted circle 803. Exemplary mobile device 804, which supports peer to peer communications, is within wireless communications range of fixed location access point 802.

Fixed location access point 802 transmits peer discovery signal 806 communicating information 808 including an indication that access point 802 supports user generated locally relevant point of interest information sharing. Signal 802 is received by mobile device 804 and information 808 is recovered.

Mobile device 804 generates and transmits signal 902 communicating a query for information relevant to the locality of access point 802. Access point 802 generates and sends signal 906 indicating the availability of information relevant to the locality of the access point 802. Mobile device 804 receives signals 906 and recovers information 908. Mobile device 804 generates and transmits signal 910 including user profile information 912. Mobile device 804 also generates and transmits signal 914 including specific request information 916.

Consider that access point 802 receives signals 910 and 914 and successfully recovers user profile information 912 and specific request information 916. Access node 802 uses the received information 912 and 916 to decide which stored locally relevant point of interest information to transmit to mobile device 804. Access point 802 generates and transmits signal 918 communicating previously stored user generated locally relevant information 920. Signal 918 is received by mobile device 804 and the information 920 is recovered.

One specific example will now be described with respect to FIG. 9. Query information 904 is a query for the various types of information that are available at access point 802. Available information 908 includes information indicating that (i) sightseeing information is available, (ii) restaurant information is available, (iii) theater information is available, and (iv) shopping information is available. User profile information 912 includes information indicating that the user of mobile device 804 speaks a particular language, e.g., French. Specific request information 916 includes information indicating that the user of mobile device 804 would like to receive restaurant information. Previously stored user generated information 920 includes information left by other users pertaining to the restaurants in the area in which the French language is spoken and/or in which the menus are available in French, e.g., recent reviews left by other users, information to find the restaurants, etc.

In various embodiments, signals 806, 902, 906, 910, 914 and 918 are peer to peer signals in accordance with a peer to peer signaling protocol. In some such embodiments, signal 806 is a broadcast signal, e.g., a peer to peer discovery broadcast signal. In some embodiments, signals 902, 906, 910 and 914 are optional signals.

Figure 10:
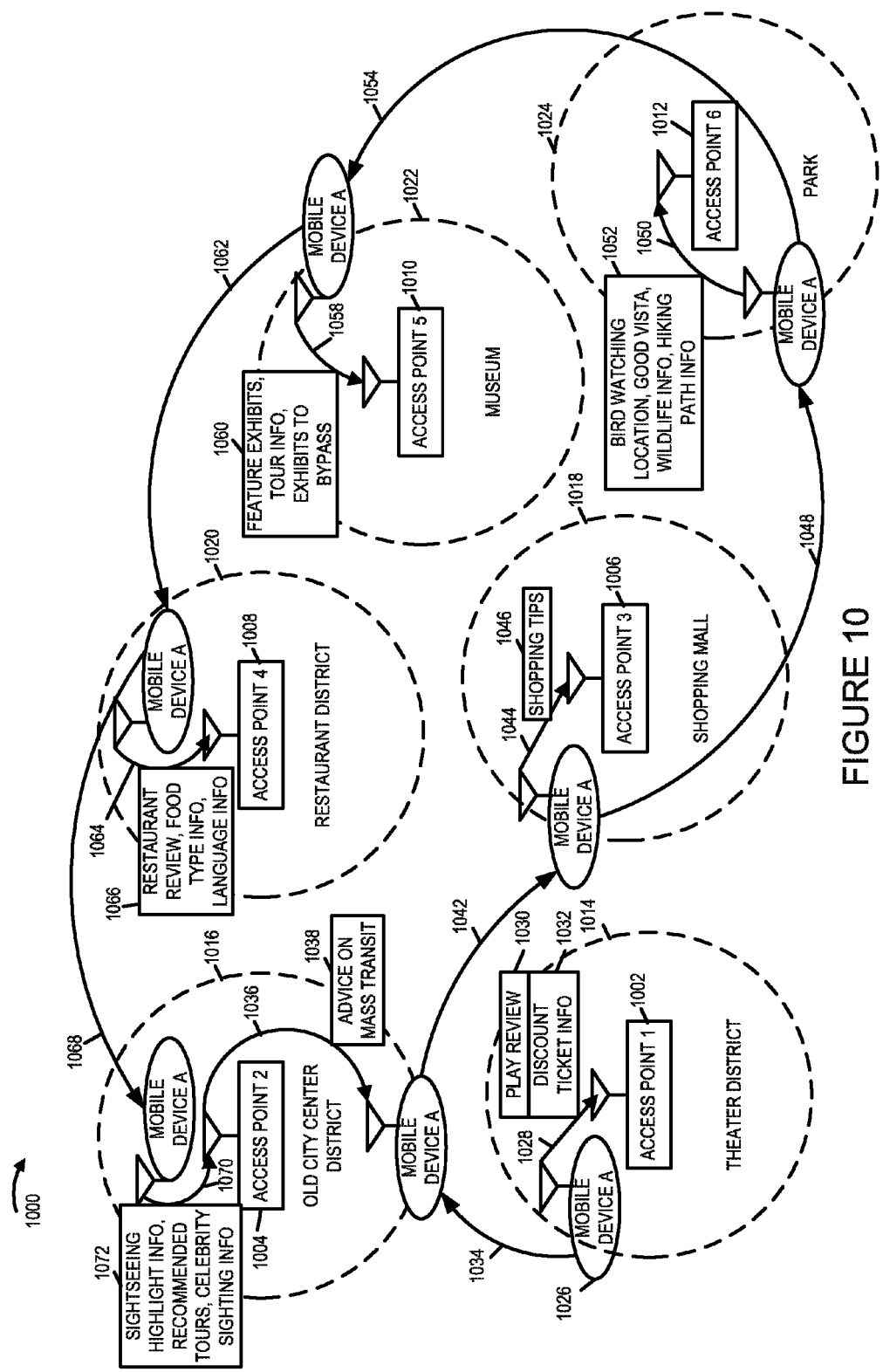
FIG. 10 is a drawing illustrating different exemplary types of user generated locally relevant information that is shared in accordance with an exemplary embodiment.

FIG. 10 is a drawing 1000 illustrating different exemplary types of user generated locally relevant information that is shared in accordance with an exemplary embodiment. In drawing 1000 there are 6 independent access points (access point 1 1002, access point 2 1004, access point 3 1006, access point 4 1008, access point 5 1010, access point 6 1012), which support user generated locally relevant point of interest information sharing and broadcast a signal, e.g., a peer discovery signal, indicating that the access point supports user generated locally relevant point of interest information sharing.

Access point 1 1002 is located in a theater district and has a wireless communications range represented by dashed line circle 1014. Access point 2 1004 is situated in an old city center historic district and has a wireless communications range represented by dashed line circle 1016. Access point 3

1006 is located in a shopping mall and has a wireless communications range represented by dashed line circle 1018. Access point 4 1008 is situated in a restaurant district and has a wireless communications range represented by dashed line circle 1020. Access point 5 1010 is located in a museum and has a wireless communications range represented by dashed line circle 1022. Access point 6 1012 is situated in a park and has a wireless communications range represented by dashed line circle 1024.

Mobile wireless device A 1026 and the access points (1002, 1004, 1006, 1008, 1010, 1012) support peer to peer communications. The access points (1002, 1004, 1006, 1008, 1010, 1012) receive and store user generated locally relevant information, sharing restriction information and user profile information. The access points categorize the stored user generated locally relevant information and age out the stored information as a function of time, relevancy and/or frequency of access. The access points transmit previously stored user generated locally relevant information to mobile devices in their vicinity in accordance with sharing restriction information and/or user profile information.

In this example, mobile device A 1026 is in wireless communications range of access point 1 1002 and transmits peer to peer signals 1028 including user generated information which includes a play review 1030 and discount theater ticket information 1032. Mobile device A 1026 moves to within wireless communications range of access point 2 1004, as indicated by arrow 1034. Mobile device A 1026 receives peer to peer signals 1036 communicating previously stored user generated locally relevant information including advice of mass transit 1038.

Mobile device A 1026 moves to within wireless communications range of access point 3 1006 as indicated by arrow 1042. Mobile device A 1026 transmits peer to peer signals 1044 including user generated locally relevant information which includes shopping tip information 1046. Mobile device A 1026 moves to within wireless communications range of access point 6 1012, as indicated by arrow 1048. Mobile device A 1026 transmits peer to peer signals 1050 communicating user generated locally relevant information which includes bird watching location information, good vista viewing information, wildlife viewing information, wildlife caution information, hiking path information and/or campsite information 1052.

Mobile device A 1026 moves to within wireless communications range of access point 5 1010 as indicated by arrow 1054. Mobile device A 1026 transmits peer to peer signals 1058 including user generated locally relevant information which includes feature exhibits, tour information, and information identifying exhibits to bypass 1060. Mobile device A 1026 moves to within wireless communications range of access point 4 1008, as indicated by arrow 1062. Mobile device A 1026 transmits peer to peer signals 1064 communicating user generated locally relevant information which includes a restaurant review, food type information, and language information 1066. Mobile device A 1026 moves to within wireless communications range of access point 2 1004 as indicated by arrow 1068. Mobile device A 1026 transmits peer to peer signals 1070 including user generated locally relevant information which includes sightseeing highlight information, information identifying recommended tours, an celebrity sighting information 1072.

The user generated locally relevant information, which mobile device A 1026 left at the access points, is stored and may be communicated to other mobile devices which come within wireless range of the access point at which the information is left and stored, in accordance with the sharing restriction information. In some embodiments, along with the user generated locally relevant information, a mobile device may, and sometimes does communicate sharing constraint information, e.g., information identifying the user generated information may be shared with members of a particular group but may not be shared with non-group members. In some embodiments, a mobile device, which desires to receive user generated locally relevant information transmits a query, user profile information and/or specific request information to the access point, and the access points selects the relevant user profile information to transmit to the mobile device as a function of the received query, user profile information and/or specific request information.

In this example, mobile device A 1026 has left user generated locally relevant information, sometimes referred to as "breadcrumbs", at each of the access points (1002, 1004, 1006, 1008, 1010, 1012) to be available for other mobile devices. In various embodiments, mobile device A 1026 receives a benefit for leaving user generated locally relevant point of interest information, e.g., a reward such as additional air link resources to use, a change in QoS service level change, a monetary reward and/or redeemable bonus points. In this example, mobile device A 1026 has received previously stored user generated locally relevant information, sometimes referred to as "breadcrumbs", at access point 2 1004.

Figure 11A:
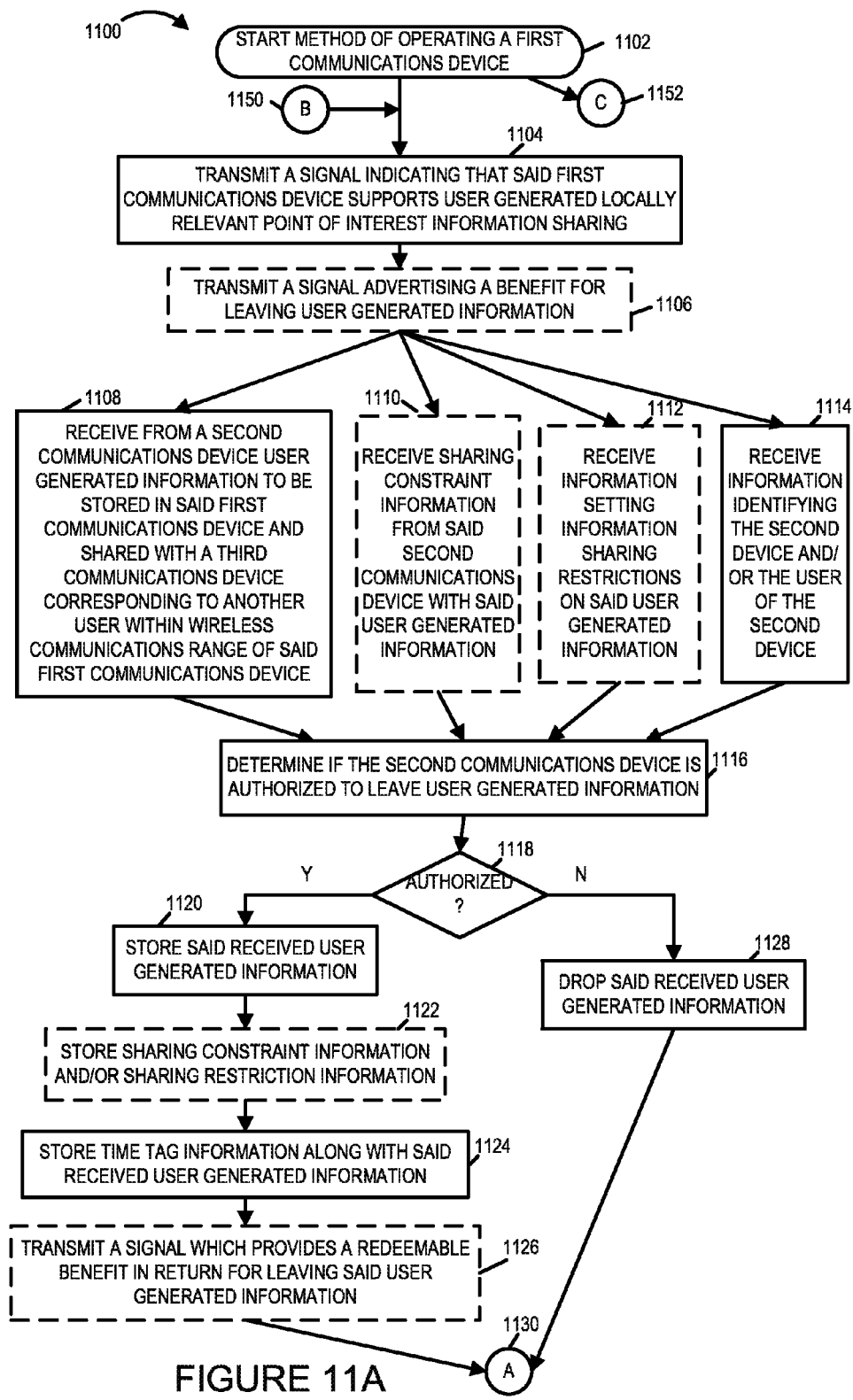
FIG. 11A is a first part of a flowchart of an exemplary method of operating a first communications device supporting user generated locally relevant point of interest information sharing, in accordance with an exemplary embodiment.

FIG. 11, comprising the combination of FIG. 11A and FIG. 11B, is a flowchart 1100 of an exemplary method of operating a first communications device, e.g., a communications device supporting user generated locally relevant point of interest information sharing, in accordance with an exemplary embodiment. The first communications device is, e.g., one of the fixed location access point or one of the mobile devices serving as a temporary access point of system 100 of FIG. 1. In various embodiments, the first communications device supports peer to peer signaling, e.g., in accordance with a predetermined peer to peer timing structure including peer to peer discovery time intervals.

In some embodiments, the first communications device is a standalone system which is not connected to the Internet. In various embodiments, the first communications device is a standalone system capable of independently processing, cataloging and responding to queries. In some embodiments, the first communications device stores locally relevant user generated information from multiple user devices. In some embodiments, the first communications device may be, and sometimes is, a fixed location access point supporting a plurality of peer to peer signaling protocols. In various embodiments, the first communications device may be, and sometimes is, a mobile peer to peer wireless terminal.

Operation of the exemplary method starts in step 1102, where the first communications device is powered on and initialized. Operation proceeds from start step 1102 to step 1104 and to step 1154, via connecting node C 1152.

Returning to step 1104, in step 1104 the first communications device transmits a signal indicating that said first communications device supports user generated locally relevant point of interest information sharing. In some embodiments, the signal indicating that the first communications device supports user generated locally relevant point of interest information sharing is a peer to peer discovery signal broadcast by said first communications device. Operation proceeds from step 1104 to step 1106.

In step 1106 the first communications device transmits a signal advertising a benefit for leaving user generated information. Operation proceeds from step 1106 to steps 1108, 1110, 1112 and 1114. In step 1108, the first communications device receives from a second communications device user generated information to be stored in said first communications device and shared with a third communications device corresponding to another user within wireless communications range of said first communications device. In some embodiments, the user generated information is one of a review, a sightseeing suggestion or a user comment relevant to something in the vicinity of the first communications device.

In step 1110 the first communications device receives sharing constraint information from said second communications device with said user generated information. In some embodiments, said sharing constraint information limits sharing of said received user generated information to members of a group to which a user who generated said information belongs. In various embodiments, said sharing constraint information precludes said user generated information from being transmitted from said first communications device to a server or core network node. In some embodiments, said sharing constraint information limits communication of said user generated information to wireless transmission of said user generated information to devices in the proximity of said first communications device. In various embodiments, the received sharing constraint information includes information specifying a subset of other users who are able to access the data stored on the first communications device by the user of the second communications device which provided the user generated information to be stored. In various embodiments, the received sharing constraint information includes information specifying a subset of other devices that are able to access the data stored on the first communications device by the user of the second communications device which provided the user generated information to be stored. In various embodiments, the received sharing constraint information includes information used to derive access information, e.g., information used to derive a key.

In step 1112 the first communications device receives information setting information sharing restrictions on said user generated information. In some embodiments, said information sharing restrictions restrict providing of said user generated information to at least one of: i) members of a group specified by said user leaving the information; ii) users who have interests in common with said user leaving the information, e.g., bird watching, Italian food, etc.; and ii) users who have expressed an interest in comments by the user leaving the information, e.g., individuals to whom the user leaving the comments is known such as friends of the user leaving the comment.

In step 1114 the first communications device receives information identifying the second communications device and/or the user of the second communications device. Operation proceeds from steps 1108, 1110, 1112 and 1114 to step 1116.

In step 1116 the first communications device determines if the second communications device is authorized to leave user generated information. In some embodiments, the first communications device stores received user generated information from devices and/or users authorized to leave user generated information at the first communications device, but not store received user generated information from devices and/ or users which are not authorized to leave user generated information at the first communications device. For example, in some embodiments, a user must be a member of an approved group or on a list of approved users to be authorized to leave user generated information. In some embodiments, a list of users who can leave user generated information at the first communications device depends on the location of the first communications device. For example, different locations are associated with different lists of who can leave feedback.

Operation proceeds from step 1116 to step 1118. In step 1118 the first communications devices controls operations as a function of the authorization determination. If the second device is not authorized to leave user generated information at the first communications device, then operation proceeds from step 1118 to step 1128, in which the first communications device drops said received user generated information. Operation proceeds from step 1128 to connecting node A 1130. Returning to step 1118, if the second communications device is authorized to leave user generated information at the first communications device, then operation proceeds from step 1118 to step 1120, in which the first communications device stores said received user generated information. Operation proceeds from step 1120 to step 1122. In step 1122 the first communications device stores the received sharing constraint information and/or sharing restriction information. Operation proceeds from step 1122 to step 1124. In step 1124 the first communications device stores time tag information along with said received user generated information. Then in step 1126, the first communications device transmits a signal to the second communications device which provides a redeemable benefit in return for leaving said user generated information. Operation proceeds from step 1126 to step 1132, via connecting node A 1130.

In step 1132 the first communications device receives a query from said second communications device for information relevant to the locality of the first communications device. Operation proceeds from step 1132 to step 1134. In step 1134 the first communications device transmits, via peer to peer signaling, to said second communications device information indicating the availability of information relevant to the locality of the first communications device. Operation proceeds from step 1134 to steps 1136 and 1138.

In step 1136 the first communications device receives user profile information from said second communications device. In some embodiments, the received user profile information from the second communications device includes information on the identity of the user using the second communications device and/or information on groups to which the user of the second communications device belongs.

In step 1138 the first communications device receives a request for user generated information from the second communications device. In some embodiments, the received request for user generated information is a request for information from a set of information previously indicated to be available at said first communications device. For example, in step 1134 the first communications device may have indicated that restaurant information, theater information and sightseeing information is available, and in step 1138 the request was for restaurant information. Operation proceeds from step 1136 and 1138 to step 1140.

In step 1140 the first communications device determines, e.g., selects, the previously stored user generated information to transmit to the second communications device. In various embodiments, the previously stored user generated information which is determined to be transmitted to the second communications device is one of: a review, a sightseeing suggestion, or a user comment relevant to something in the vicinity of the first communications device. Step 1140 may, and sometimes does include one or more or all of steps 1142, 1144 and 1146. In step 1142 the first communications device bases the determination on the received user profile information. In step 1144 the first communications device bases the determination on received sharing constraint and/or sharing restriction information. In step 1146 the first communications device bases the determination on the received user request. Operation proceeds from step 1140 to step 1148. In step 1148 the first communications device transmits to said second communications device previously stored user generated information via peer to peer signaling. In some embodiments, the previously stored user generated information transmitted in step 1148 may be, and sometimes is, transmitted in response to the received request of step 1138. Operation proceeds from step 1148 via connecting node B 1150 to step 1104.

Returning to step 1154, in step 1154, which is repeated on an ongoing basis, the first communications device processes received and stored user generated information. Step 1154 includes steps 1156, 1158, 1160, and 1162. In step 1156 the first communications device catalogs received user generated information. In step 1158 the first communications device updates stored information. In some embodiments, the user generated information which is received includes information indicating one of a predetermined plurality of feedback options, e.g., one of a plurality of rating levels corresponding to something being rating. In some embodiments, the first communications device limits voting to one vote per device or one vote per user on an individual item being voting on. Various embodiments allow updating of one's vote without multiple vote counting. For example, in step 1158 the first communications device may update the second communications device's review rating corresponding to a particular restaurant from good to excellent.

In step 1160 the first communications device performs language translations. For example, the first communications device may have reviewed a restaurant review from the second communications device in English and in step 1160 may translate the review into both Spanish and French and then store the reviews in the additional languages so as to be readily available for other users in the future. In step 1162 the first communications device ages out, e.g., removes from storage, as a function of time, relevancy or frequency of access previously stored user generated information. In some embodiments, step 1162 includes step 1164 in which the first communications device limits the maximum storage space for a device or user.

In some embodiments, the first communications device subjects individual users to a predetermined amount of storage space. In some embodiments, the first communications device includes local storage for storing user generated information. In some other embodiments, the first communications device is coupled to a local storage device for storing said user generated information.

It should be appreciated that many mobile wireless devices will typically be operating concurrently, and each mobile wireless device which is within wireless range of an access point which supports user generated locally relevant point of interest information sharing may be transmitting and/or receiving user generated locally relevant information.

Figure 12:
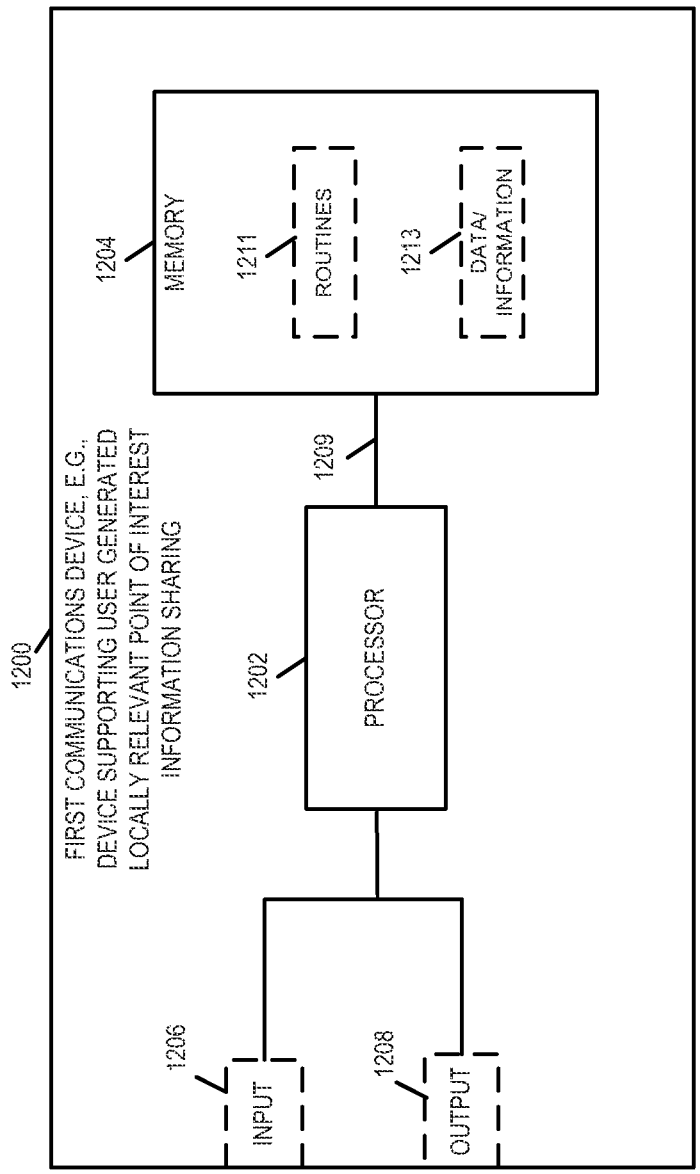
FIG. 12 is a drawing of an exemplary first communications device in accordance with an exemplary embodiment.

FIG. 12 is a drawing of an exemplary first communications device 1200, e.g., a communications device supporting user generated locally relevant point of interest information sharing and peer to peer signaling, in accordance with an exemplary embodiment. Exemplary first communications device is, e.g., a fixed location access point supporting user generated locally relevant point of interest information sharing and peer to peer signaling or a mobile wireless communications device supporting user generated locally relevant point of interest information sharing and peer to peer signaling which is serving as a temporary access point at a particular location. Exemplary first communications device 1200 is, e.g., one of the fixed location access points of system 100 of FIG. 1 or one of the mobile devices serving as a temporary access point of system 100 of FIG. 1. Exemplary first communications device 1200 may, and sometimes does, implement a method in accordance with flowchart 1100 of FIG. 11.

Steps in FIG. 11 which are indicated by dotted line boxes are optional steps. The flowchart of FIG. 11 has been described for an embodiment in which each of the optional steps are performed. If an optional step is omitted, the omitted step is bypassed in the operational flow.

First communications device 1200 includes a processor 1202 and memory 1204 coupled together via a bus 1209 over which the various elements (1202, 1204) may interchange data and information. First communications device 1200 further includes an input module 1206 and an output module 1208 which may be coupled to processor 1202 as shown. However, in some embodiments, the input module 1206 and output module 1208 are located internal to the processor 1202. Input module 1206 can receive input signals. Input module 1206 can, and in some embodiments does, include a wireless receiver and/or a wired or optical input interface for receiving input. Output module 1208 may include, and in some embodiments does include, a wireless transmitter and/or a wired or optical output interface for transmitting output. In some embodiments, memory 1204 includes routines 1211 and data/information 1213.

Processor 1202 is configured to: transmit a signal indicating that said first communications device supports user generated locally relevant point of interest information sharing; and receive from a second communications device user generated information to be stored in said first communications device and shared with a third communications device corresponding to another user within wireless communications range of said first communications device. In some embodiments, processor 1202 is further configured to: receive sharing constraint information from said second communications device with said user generated information. In some embodiments, the sharing constraint information limits sharing of said received user generated information to members of a group to which a user who generated said information belongs. In various embodiments, sharing constraint information precludes said user generated information from being transmitted from said first communications device to a server or core network node. In some embodiments, said sharing constraint information limits communication of said user generated information to wireless transmission of said user generated information to devices in the proximity of said first communications device. In various embodiments, the received sharing constraint information includes information specifying a subset of other users who are able to access the data stored on the first communications device by the user of the second communications device which provided the user generated information to be stored.

In some embodiments the communications device including processor 1202 is a standalone system which is not connected to the Internet. In various embodiments the first communications device including processor 1202 is a stand along system capable of independently processing, cataloging and responding to queries. In some embodiments, the first communications device stores locally relevant user generated information from multiple user devices, and processor 1202 is configured to store locally relevant user generated information from multiple user devices. In some embodiments, the first communications device including processor 1202 is a fixed location access point and processor 1202 is configured to support peer to peer signaling and configured to support user generated locally relevant point of interest information sharing. In some embodiments, the first communications device including processor 1202 is a mobile peer to peer wireless terminal and processor 1202 is configured to support peer to peer signaling and configured to support user generated locally relevant point of interest information sharing, e.g., while in a temporary access point mode of operation.

In some embodiments, processor 1202 is further configured to: transmit a signal advertising a benefit for leaving user generated information. In various embodiments, processor 1202 is further configured to: transmit a signal which provides a redeemable benefit in return for leaving said user generated information.

In some embodiments, the signal indicating that said first communications device supports user generated locally relevant point of interest information sharing is a peer to peer discovery signal broadcast by said first communications device, and processor 1202 is further configured to generate the peer to peer discovery broadcast signal indicating that the first communications device supports user generated locally relevant point of interest information sharing. In some embodiments the user generated information is one of a review, sightseeing suggestion, or a user comment relevant to something in the vicinity of said first communications device.

In some embodiments, processor 1202 is further configured to: receive information setting information sharing restrictions on said user generated information. In some such embodiments, said information sharing restrictions restrict providing of said user generated information to at least one of: i) members of a group specified by said user leaving the information; ii) users who have interests in common with said user leaving the information, e.g., bird watching, Italian food; and ii) users who have expressed an interest in comments by the user leaving the information, e.g., individuals to whom the user leaving the comments is known such as friends of the user leaving the comment.

In some embodiments, processor 1202 is further configured to: receive a query from said second communications device for information relevant to the locality of the first communications device. In various embodiments, processor 1202 is further configured to: respond to a received query for information relevant to the locality of the first communications device.

Processor 1202 is further configured to: transmit to said second communications device previously stored user generated information via peer to peer signaling. In some such embodiments, the stored user generated information is one of a review, sightseeing suggestion, or a user comment relevant to something in the vicinity of said first communications device.

In various embodiments, processor 1202 is further configured to: transmit, via peer to peer signaling, information indicating the availability of information relevant to the locality of the first communications device, e.g., prior to transmitting said previously stored user generated information. Processor 1202, in some embodiments, is further configured to: receive a request for user generated information from the second communications device; and processor 1202 is configured to transmit previously stored user generated information in response to said request. In some such embodiments, said received request for user generated information is a request for information from a set of information previously indicated to be available at said first communications device, and processor 1202 is further configured to determine the previously stored information to transmit to the second communications device based on the received request.

In some embodiments, processor 1202 is further configured to: receive user profile information from said second communications device and determine the previously stored user generated information to transmit based on the supplied user profile information. In some such embodiments, the received user profile information from said second communications device includes information on the identity of the user using the second communications device and/or information on groups to which the user of the second communications device belongs; and processor 1202 is further configured to determine the previously stored user generated information to transmit to the second communications device based on the user profile information.

In some embodiments, processor 1202 is configured to process received and stored user generated information. In various embodiments, processor 1202 is further configured to: age out as a function of time, relevancy, or frequency of access the user generated information stored in the first communications device.

Processor 1202, in some embodiments, is further configured to: determine if said second communications device is authorized to leave user generated information and store said received user generated information when said second communications device is determined to be authorized to leave user generated information. In some such embodiments, processor 1202 is further configured to drop said user generated information when said second communication device is determined not to be authorized to leave user generated information. For example, the first communications device stores user generated information from users or devices authorized to leave said information. For example, if the second communications device is a member of approved group of devices or if the user of the second communications device is on list of approved users, the second communications device may be authorized to leave said user generated information. In some embodiments, lists of who can leave information are dependent on the first device location, e.g., different locations are associated with different lists of who can leave feedback.

In some embodiments, processor 1202 is configured to limit the number of information storage transactions for a device as a function of time, e.g., a limited number of reviews can be posted from the second communications device in a given time period.

In some embodiments, user generated information includes information indicating one of predetermined plurality of feedback options, e.g., possible rating levels. In various embodiments, processor 1202 is configured to limit voting to one per device per issue or item being voted on. In various embodiments, processor 1202 is further configured to update stored user generated information, e.g., processor 1202 is configured to update a vote on an item or issue under consideration. In various embodiments, processor 1202 is configured to prevent a device or user from having multiple votes stored or counted corresponding to a particular issue or item, e.g., the second communications device can not have stored and counted multiple negative reviews corresponding to the same restaurant.

In some embodiments, processor 1202 is further configured to subject individual users and/or individual devices to a predetermined amount of storage space. In various embodiments, said first communications device includes local storage for storing said user generated information. In some embodiments, the first communications device is coupled to a local storage device for storing said user generated information, and processor 1202 is configured to store information on the local storage device and retrieve information from the local storage device. In various embodiments, processor 1202 is further configured to: catalog said received user generated information, e.g., classifying received user generated information in one of a plurality of predetermined categories pertinent to the location. Different first communications devices may, and sometimes do, have different categories for cataloging received user generated information. For example, in a downtown city area, the categories may include, e.g., restaurant reviews, sightseeing highlights, theater reviews, bars, nightclubs, etc. As another example, in a park, the categories may include, e.g., camping information, viewing area information, wildlife information, path information, caution information, emergency information.

Processor 1202, in some embodiments, is further configured to perform language translations. For example, a received stored set of user generated information from the second communications device in a first language in some embodiments, is automatically translated into a plurality of different languages and stored. Thus the received user generated information from the second communications device is readily available for distribution to other mobile devices in the vicinity of the first communications device which do not necessarily use the same language as the second communications device.

Figure 13A:
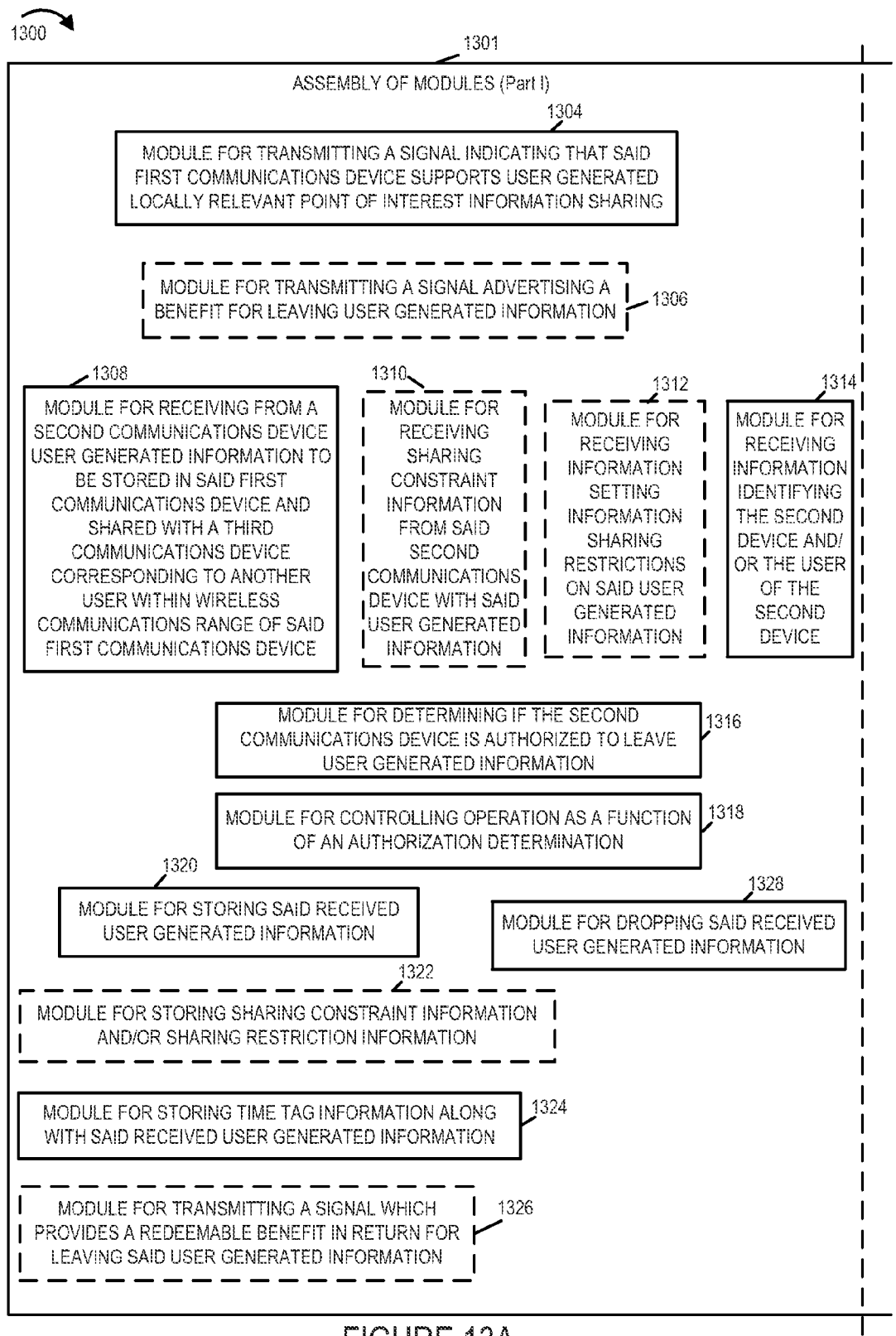
FIG. 13A is a first portion of an assembly of modules which can, and in some embodiments is, used in the exemplary first communications device illustrated in FIG. 12.
Figures 13, 13B:
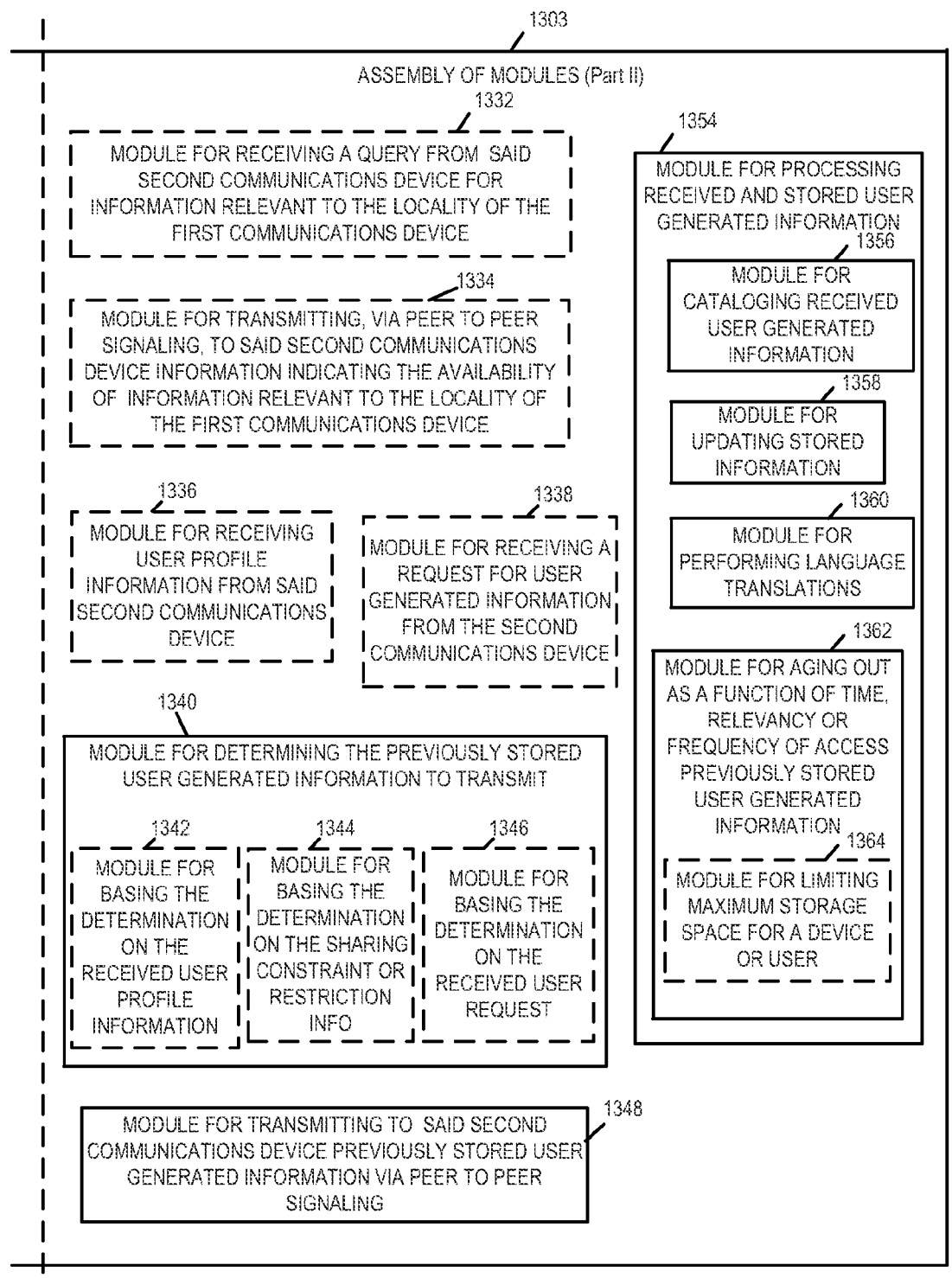
FIG. 13B is a second portion of an assembly of modules which can, and in some embodiments is, used in the exemplary first communications device illustrated in FIG. 12.

FIG. 13 is an assembly of modules 1300 which can, and in some embodiments is, used in the exemplary first communications device 1200 illustrated in FIG. 12. The modules in the assembly 1300 can be implemented in hardware within the processor 1202 of FIG. 12, e.g., as individual circuits. Alternatively, the modules may be implemented in software and stored in the memory 1204 of first communications device 1200 shown in FIG. 12. In some such embodiments, the assembly of modules 1300 is included in routines 1211 of memory 1204 of device 1200 of FIG. 12. While shown in the FIG. 12 embodiment as a single processor, e.g., computer, it should be appreciated that the processor 1202 may be implemented as one or more processors, e.g., computers. When implemented in software the modules include code, which when executed by the processor, configure the processor, e.g., computer, 1202 to implement the function corresponding to the module. In some embodiments, processor 1202 is configured to implement each of the modules of the assembly of modules 1300. In embodiments where the assembly of modules 1300 is stored in the memory 1204, the memory 1204 is a computer program product comprising a computer readable medium, e.g., a non-transitory computer readable medium, comprising code, e.g., individual code for each module, for causing at least one computer, e.g., processor 1202, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 13 control and/or configure the first communications device 1200 or elements therein such as the processor 1202, to perform the functions of the corresponding steps illustrated and/or described in the method of flowchart 1100 of FIG. 11.

Assembly of modules 1300 of FIG. 13 comprising a first part 1301 in FIG. 13A and second part 1303 of FIG. 13B includes a module 1304 for transmitting a signal indicating that said first communications device supports user generated locally relevant point of interest information sharing, a module 1308 for receiving from a second communications device user generated information to be stored in said first communications device and shared with a third communications device corresponding to a another user within wireless communications range of said first communications device, a module 1314 for receiving information identifying the second communications device and/or the user of the second communications device, a module 1316 for determining if the second communications device is authorized to leave user generated information, a module 1318 for controlling operation as a function of an authorization determination by module 1316, a module 1320 for storing said received user generated information, e.g., when it is determined that said second device is authorized to leave user generated information, a module 1328 for dropping said received user generated information, e.g., when it is determined that said second device is not authorized to leave said user generated information, a module 1324 for storing time tag information along with said received user generated information, a module 1340 for determining the previously stored user generated information to transmit, a module 1348 for transmitting to said second communications device previously stored user generated information via peer to peer signaling, and a module 1354 for processing received and stored user generated information.

In various embodiments, assembly of modules 1300 includes one or more or all of: a module 1306 for transmitting a signal advertising a benefit for leaving user generated information, a module 1310 for receiving sharing constraint information from said second communications device with said user generated information, a module 1312 for receiving information setting information sharing restrictions on said user generated information, a module 1322 for storing sharing constraint information and/or sharing restriction information, a module 1326 for transmitting a signal which provides a redeemable benefit in return for leaving said user generated information, a module 1332 for receiving a query form said second communications device for information relevant to the locality of the first communications device, a module 1334 for transmitting, via peer to peer signaling, to said second communications device information indicating the availability of information relevant to the locality of the first communications device, a module 1336 for receiving user profile information from said second communications device, and a module 1338 for receiving request for user generated information from the second communications device.

In some embodiments, module 1340 for determining the previously stored user generated information to transmit includes one or more or all of: a module 1342 for basing the determination on the received user profile information, a module 1344 for basing the determination on the sharing constraint and/or sharing restriction information, and a module 1346 for basing the determination on the received user request. Module 1354 for processing received and stored user generated information 1354 includes a module 1356 for cataloging received user generated information, a module 1358 for updating stored user information, a module 1360 for performing language translations, and a module 1362 for aging out as a function of time, relevancy and/or frequency of access previously stored user generated information. In some such embodiments, module 1362 includes a module 1364 for limiting maximum storage space for a device or user, e.g. to store user generated information.

Figure 14:
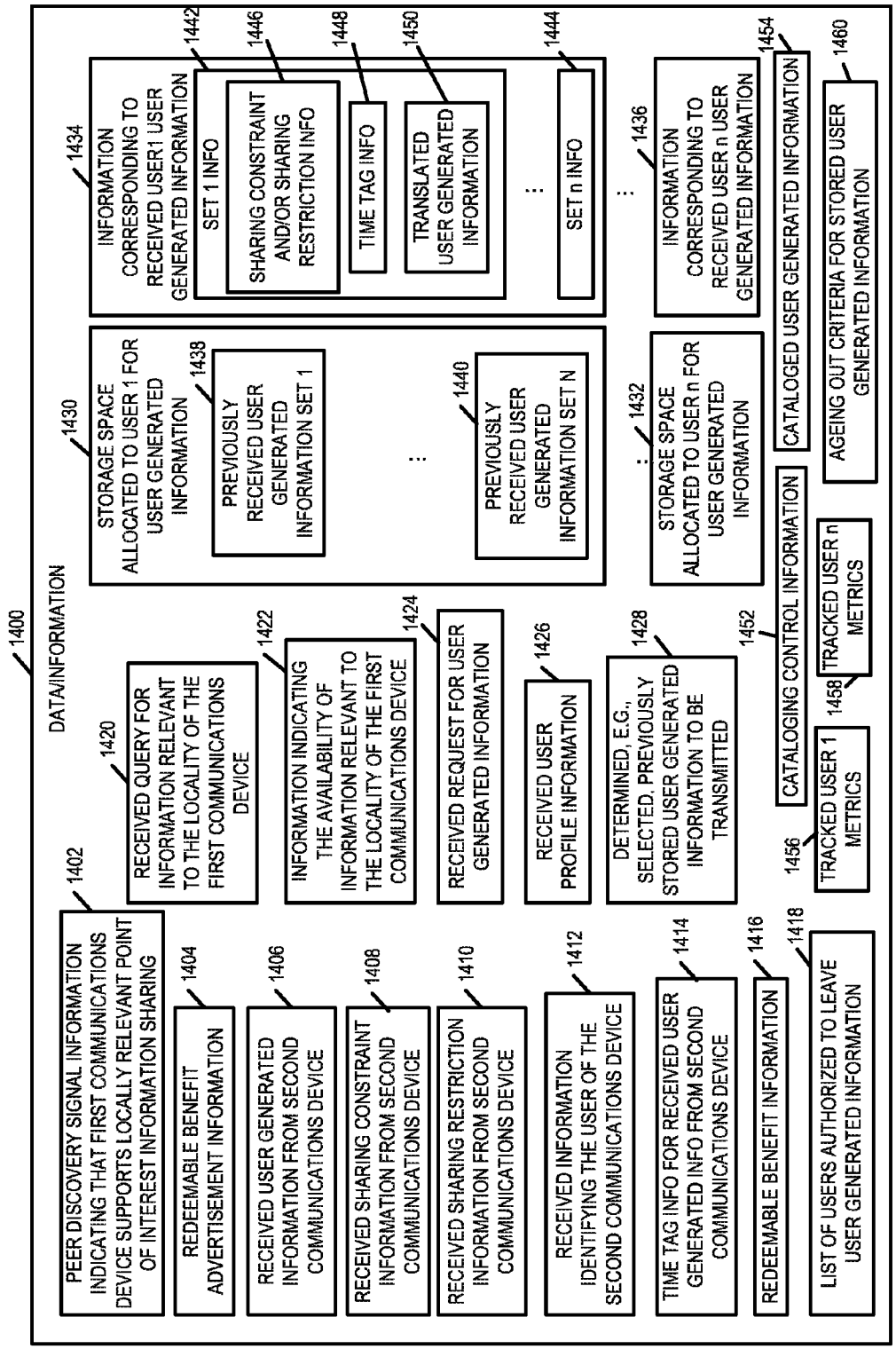
FIG. 14 is a drawing of exemplary data/information which may be included in the exemplary first communications device of FIG. 12 in accordance with an exemplary embodiment.

FIG. 14 is a drawing of exemplary data/information 1400 in accordance with an exemplary embodiment. Data/information 1400 is, e.g., data/information 1213 of memory 1204 of exemplary first communications device 1200 of FIG. 12.

Data/information 1400 includes peer discovery signal information indicating that the first communications device supports locally relevant point of interest information sharing 1402, redeemable benefit advertisement information 1404, received user generated information from the second communications device 1406, received sharing constraint information from the second communications device 1408, received sharing restriction information from the second communications device 1410, received information identifying the user of the second communications device 1412, time tag information for received user generated information from the second communications device 1414, redeemable benefit information 1416, and a list of users authorized to leave user generated information at the first communications device 1418. Data/information 1400 further includes a received query for information relevant to the locality of the first communication device 1420, information indicating the availability of information relevant to the locality of the first communications device 1422, received request for user generated information 1424, received user profile information 1426, and determined, e.g., selected, previously stored user generated information to be transmitted 1428.

Data/information 1400 further includes storage space allocated for user 1 to store user generated information 1430, . . . , storage space allocated for user n to store user generated information 1432. Storage space allocated for user 1 to store user generated information 1430 includes a plurality of sets of user generated information (previously received user generated information set 1 1438, . . . , previously received user generated information set N 1440). Data/information 1434 further includes information corresponding to received user 1 user generated information 1434, . . . , information corresponding to received user n User generated information 1436. Information corresponding to received user 1 user generated information 1434 includes information corresponding to each of the set of user1 user generated information which is stored (set 1 information 1442, . . . , set n information 1444). Set 1 information 1442 includes sharing constraint and/or sharing restriction information 1446, time tag information 1448 and translated user generated information 1450.

Data/information 1400 further includes cataloging control information 1452 and cataloged user generated information 1454. In some embodiments, the cataloging control information 1452 includes information identifying different categories under which received stored user generated information may be classified, e.g., restaurant reviews, sightseeing tips, theater reviews, nightclubs, museums, bars, etc. Cataloged user generated information 1454 in some embodiments, includes reorganized previously received user generated information and corresponding information, e.g., in accordance with different categories. Cataloged user generated information 1454 in some embodiments, includes pointer information for accessing reorganized previously received user generated information and corresponding information, e.g., in accordance with different categories.

Data/information 1400 further includes tracked user metrics (tracked user 1 metrics 1456, . . . , tracked user n metrics 1458) and ageing out criteria for stored user generated information 1460. Tracked user metrics include, e.g., a number of times a user has left user generated information at the first communications device, the frequency of a user leaving information at the first communications device, the number of sets of user generated information a user has left at the first communications device and the amount of user generated information a user has left at the first communications device. Exemplary ageing out criteria 1460 include criteria, e.g., time limits, relevancy criteria, frequency of access criteria, storage limits, etc., used to decide when to remove, e.g., no longer retain, previously received user generated information which is currently being stored at the first communications device.

Various embodiments are directed to methods of leaving and/or discovering user-provided information, e.g., nuggets of user provided information sometimes referred to as breadcrumbs, that persist locally and are discoverable by other users in that locale. In accordance with some embodiments, users with, for example, peer to peer mobile enabled devices, e.g. in accordance with a peer to peer signaling protocol, can leave breadcrumbs in a location, the breadcrumbs being stored in a node, e.g., a local access point serving that location. These breadcrumbs could be, e.g., mini-reviews of local restaurants, bars, stores, information about the history of a location, or anything else. In some embodiments, to prevent too many breadcrumbs from accumulating over time, after a predetermined time period, e.g., N months or some other reasonable time period based on the storage capabilities and/or amount of breadcrumbs being deposited over a given time period, the breadcrumbs are decayed out of the storage node, e.g., access point. By limiting the amount of breadcrumbs stored at a location, it is more likely that people accessing those breadcrumbs will not be overwhelmed with information and that they are receiving up to date reviews. In some embodiments, these breadcrumbs would present themselves automatically to people as they enter within range of the access point and monitor discovery signals being transmitted from the storage node, e.g., access point. In some embodiments, due to the limited area covered by a local access point, the number of breadcrumbs will be much smaller and easier to search through as compared to trying to find information about the location over the Internet.

In accordance with one feature of various embodiments, breadcrumbs are directed to users with similar attributes and preferences. For example, breadcrumbs left by teenagers can be made known to other teenagers in the area due to their similar interests. Similarly, a user with a history of shopping at certain shops can have more relevant breadcrumbs being flagged and/or communicated over other less relevant breadcrumbs that may be also stored and available the node.

In some embodiments, a user can also set a preference for receiving certain types of breadcrumbs. As those breadcrumbs are dropped by other users, they are preferentially made known to the user who selected the preference. An example of this would be the preference to receive breadcrumbs about local celebrity sightings or receiving information about flash mobs about to occur in an area.

In another aspect of some embodiments, breadcrumbs can enable dynamic polling of large groups of people gathered together. A breadcrumb containing information about a vote can be dropped and pushed to each of the peer to peer enabled users within range of an access point, and their votes can be recorded.

In another aspect of some embodiments, breadcrumbs can be associated with various tribes/groups, and can be selectively exposed or masked as a function of relevancy, access rights, and/or preferences of a user. For example, a person could leave breadcrumbs for family or friends about a certain locale, and individuals authorized to view such breadcrumbs would be exposed thereto but other unauthorized individuals would not be given access to those breadcrumbs. In various embodiments, encryption, masking, unmasking, filtering, pull-based and/or pull-based methods can be, and sometimes are, employed.

In various embodiments a communications device, e.g., mobile wireless device 300 of FIG. 3 or mobile wireless device 600 of FIG. 6 or device 1200 of FIG. 12, includes a module corresponding to each of the individual steps and/or operations described with regard to any of the Figures in the present application and/or described in the detailed description of the present applications. The modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first communications device to support interactive location-based information sharing comprising:
    detecting a signal indicating that a second communications device in wireless communications range of said first communications device supports user generated locally relevant point of interest information sharing;
    transmitting to said second communications device user generated information to be stored in said second communications device and shared with a third communications device corresponding to another user within wireless communications range of said second communications device; and
    transmitting, to said second communications device, sharing information indicating multiple constraints placed by said first communications device on sharing of said user generated information transmitted by the first communications device to the second communications device, said sharing information precluding said user generated information transmitted to the second communications device from being transmitted from said second communications device to a server or core network node and limiting sharing of said user generated information to providing of said user generated information to users who have expressed an interest in comments by the user leaving the information.

2. The method of claim 1, further comprising:
querying said second communications device for information relevant to the locality of the second communications device.

3. The method of claim 1, wherein said sharing information limits sharing of said user generated information to members of a group to which a user who generated said information belongs.

4. A first communications device supporting interactive location based information sharing, the first communications device comprising:
means for detecting a signal indicating that a second communications device in wireless communications range of said first communications device supports user generated locally relevant point of interest information sharing;
means for transmitting to said second communications device user generated information to be stored in said second communications device and shared with a third communications device corresponding to another user within wireless communications range of said second communications device; and
means for transmitting sharing information to said second communications device, said sharing information indicating multiple constraints placed by said first communications device on sharing of said user generated information transmitted by the first communications device to the second communications device, said sharing information precluding said user generated information transmitted to the second communications device from being transmitted from said second communications device to a server or core network node and limiting sharing of said user generated information to providing of said user generated information to users who have expressed an interest in comments by the user leaving the information.

5. The first communications device of claim 4, further comprising:
means for querying said second communications device for information relevant to the locality of the second communications device.

6. The first communications device of claim 4, wherein said sharing information limits sharing of said user generated information to members of a group to which a user who generated said information belongs.

7. A computer program product for use in a first communications device, the computer program product comprising:
a non-transitory computer readable medium comprising:
code for causing at least one computer to detect a signal indicating that a second communications device in wireless communications range of said first communications device supports user generated locally relevant point of interest information sharing;
code for causing said at least one computer to transmit to said second communications device user generated information to be stored in said second communications device and shared with a third communications device corresponding to another user within wireless communications range of said second communications device; and
code for causing said at least one computer to transmit sharing information to said second communications device, said sharing information indicating multiple constraints placed by said first communications device on sharing of said user generated information transmitted by the first communications device to the second communications device, said sharing information precluding said user generated information transmitted to the second communications device from being transmitted from said second communications device to a server or core network node and limiting sharing of said user generated information to providing of said user generated information to users who have expressed an interest in comments by the user leaving the information.

8. A first communications device comprising:
at least one processor configured to:
detect a signal indicating that a second communications device in wireless communications range of said first communications device supports user generated locally relevant point of interest information sharing;
transmit to said second communications device user generated information to be stored in said second communications device and shared with a third communications device corresponding to another user within wireless communications range of said second communications device; and
transmit sharing information to said second communications device, said sharing information indicating multiple constraints placed by said first communications device on sharing of said user generated information transmitted by the first communications device to the second communications device, said sharing information precluding said user generated information transmitted to the second communications device from being transmitted from said second communications device to a server or core network node and limiting sharing of said user generated information to providing of said user generated information to users who have expressed an interest in comments by the user leaving the information; and
memory coupled to said at least one processor.

9. The first communications device of claim 8, wherein said at least one processor is further configured to:
query said second communications device for information relevant to the locality of the second communications device.

10. A method of operating a first communications device to support interactive location-based information sharing comprising:
transmitting a signal indicating that said first communications device supports user generated locally relevant point of interest information sharing;
receiving from a second communications device user generated information to be stored in said first communications device and shared with a third communications device corresponding to another user within wireless communications range of said first communications device; and
receiving, from said second communications device, sharing information indicating multiple constraints placed by said second communications device on sharing of said user generated information transmitted by the second communications device to said first communications device, said sharing information precluding said user generated information received from the second communications device from being transmitted from said first communications device to a server or core network node and limiting sharing of said user generated information to providing of said user generated information to users who have expressed an interest in comments by the user leaving the information.

11. The method of claim 10, further comprising:
transmitting to said second communications device previously stored user generated information via peer to peer signaling.

12. The method of claim 11, further comprising:
receiving user profile information from said second communications device; and
determining the previously stored user generated information to transmit to the second communications device based on the supplied user profile information.

13. The method of claim 10, further comprising:
ageing out as a function of time, relevancy, or frequency of access the user generated information stored in the first communications device.

14. The method of claim 10, further comprising:
determining if said second communications device is authorized to leave user generated information;
when said second communications device is authorized to leave user generated information, storing said received user generated information; and
when said second communication device is not authorized to leave user generated information dropping said user generated information.

15. A first communications device comprising:
means for transmitting a signal indicating that said first communications device supports user generated locally relevant point of interest information sharing;
means for receiving from a second communications device user generated information to be stored in said first communications device and shared with a third communications device corresponding to another user within wireless communications range of said first communications device; and
means for receiving, from said second communications device, sharing information indicating multiple constraints placed by said second communications device on sharing of said user generated information transmitted by the second communications device to said first communications device, said sharing information precluding said user generated information received from the second communications device from being transmitted from said first communications device to a server or core network node, and limiting sharing of said user generated information to providing of said user generated information to users who have expressed an interest in comments by the user leaving the information.

16. The first communications device of claim 15, further comprising:
means for transmitting to said second communications device previously stored user generated information via peer to peer signaling.

17. The first communications device of claim 16, further comprising:
means for receiving user profile information from said second communications device; and
means for determining the previously stored user generated information to transmit to said second communications device based on the supplied user profile information.

18. The first communications device of claim 15, further comprising:
means for ageing out as a function of time, relevancy, or frequency of access the user generated information stored in the first communications device.

19. The first communications device of claim 15, further comprising:
means for determining if said second communications device is authorized to leave user generated information;
means for storing said received user generated information when said second communications device is authorized to leave user generated information; and
means for dropping said received user generated information when said second communication device is not authorized to leave user generated information.

20. A computer program product for use in a first communications device, the computer program product comprising:
a non-transitory computer readable medium comprising:
code for causing at least one computer to transmit a signal indicating that said first communications device supports user generated locally relevant point of interest information sharing;
code for causing said at least one computer to receive from a second communications device user generated information to be stored in said first communications device and shared with a third communications device corresponding to another user within wireless communications range of said first communications device; and
code for causing said at least one computer to receive sharing information from said second communications device, said sharing information indicating multiple constraints placed by said second communications device on sharing of said user generated information transmitted by the second communications device to said first communications device, said sharing information precluding said user generated information received from the second communications device from being transmitted from said first communications device to a server or core network node and limiting sharing of said user generated information to providing of said user generated information to users who have expressed an interest in comments by the user leaving the information.

21. A first communications device comprising:
at least one processor configured to:
transmit a signal indicating that said first communications device supports user generated locally relevant point of interest information sharing;
receive from a second communications device user generated information to be stored in said first communications device and shared with a third communications device corresponding to another user within wireless communications range of said first communications device; and
receive sharing information from said second communications device, said sharing information indicating multiple constraints placed by said second communications device on sharing of said user generated information transmitted by the second communications device to said first communications device, said sharing information precluding said user generated information received from the second communications device from being transmitted from said first communications device to a server or core network node and limiting sharing of said user generated information to providing of said user generated information to users who have expressed an interest in comments by the user leaving the information; and memory coupled to said at least one processor.

22. The first communications device of claim 21, wherein said at least one processor is further configured to:

transmit to said second communications device previously stored user generated information via peer to peer signaling.

23. The first communications device of claim 22, wherein said at least one processor is further configured to:

receive user profile information from said second communications device; and determine the previously stored user generated information to transmit based on the supplied user profile information.

24. The first communications device of claim 20, wherein said at least one processor is further configured to:

age out as a function of time, relevancy, or frequency of access the user generated information stored in the first communications device.

25. The method of claim 1 wherein one of said multiple constraints limits communication of said user generated information to wireless transmission of said user generated information to devices in the proximity of said second communications device.

26. The method of claim 1, further comprising:

receiving from the second communications device a signal advertising a benefit for leaving user generated information.

27. The method of claim 26, further comprising:

receiving a signal from the second communications device which provides a redeemable benefit in return for leaving said user generated information.

28. The method of claim 1, wherein one of said multiple constraints restricts providing of said user generated information to users which know a password specified by said user leaving the information.

29. The method of claim 1, wherein said second communications device is a standalone system that is not connected to the Internet.

30. The method of claim 1, wherein said user generated information is a sightseeing suggestion.

31. The method of claim 1 wherein said user generated information is a comment relevant to something in a vicinity of the second communications device.

* * * * *